US008488938B2

(12) United States Patent
Kewitsch et al.

(10) Patent No.: US 8,488,938 B2
(45) Date of Patent: Jul. 16, 2013

(54) BRAIDED FIBER OPTIC CROSS-CONNECT SWITCHES

(75) Inventors: Anthony Kewitsch, Santa Monica, CA (US); Seth Greenberg, Newbury Park, CA (US); Paul Hudson, Newbury Park, CA (US)

(73) Assignee: Telescent Inc., Marina del Rey, CA (US)

( * ) Notice: Subject to any disclaimer, the term of this patent is extended or adjusted under 35 U.S.C. 154(b) by 408 days.

(21) Appl. No.: 12/779,187

(22) Filed: May 13, 2010

(65) Prior Publication Data
US 2010/0220953 A1    Sep. 2, 2010

Related U.S. Application Data

(63) Continuation-in-part of application No. 12/196,262, filed on Aug. 21, 2008, now Pat. No. 8,068,715, and a continuation-in-part of application No. 12/196,266, filed on Aug. 21, 2008.

(60) Provisional application No. 61/178,961, filed on May 16, 2009.

(51) Int. Cl.
*G02B 6/00*    (2006.01)
*G02B 6/26*    (2006.01)
*G02B 6/35*    (2006.01)

(52) U.S. Cl.
USPC .............................. 385/147; 385/25; 385/17

(58) Field of Classification Search
USPC ..................................... 385/25, 147
See application file for complete search history.

(56) References Cited

U.S. PATENT DOCUMENTS

| 5,613,021 | A  | * | 3/1997 | Saito et al. ..................... 385/17 |
| 6,339,733 | B1 | * | 1/2002 | Mizutani et al. ............. 700/245 |
| 6,973,251 | B2 | * | 12/2005 | Morellec et al. ............. 385/135 |
| 2008/0247319 | A1 | * | 10/2008 | Roos et al. ..................... 370/241 |
| 2009/0214160 | A1 | * | 8/2009 | Arol et al. ....................... 385/17 |

* cited by examiner

*Primary Examiner* — Omar Rojas
(74) *Attorney, Agent, or Firm* — Raymond Bogucki

(57) ABSTRACT

This invention discloses a highly scalable and modular automated optical cross connect switch comprised of large numbers of densely packed fiber strands suspended within a common volume. In particular, apparatus and methods enabling programmable interconnection of large numbers of optical fibers (100's-1000's) having structured and coherent braid representations are provided.

8 Claims, 24 Drawing Sheets

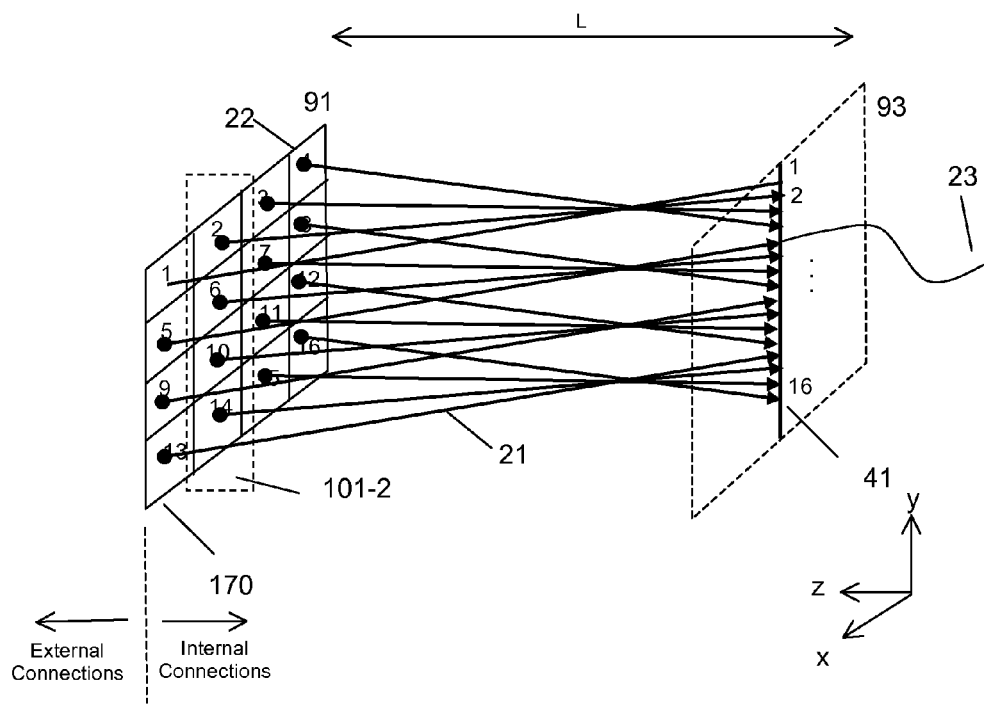
FIG. 2-A
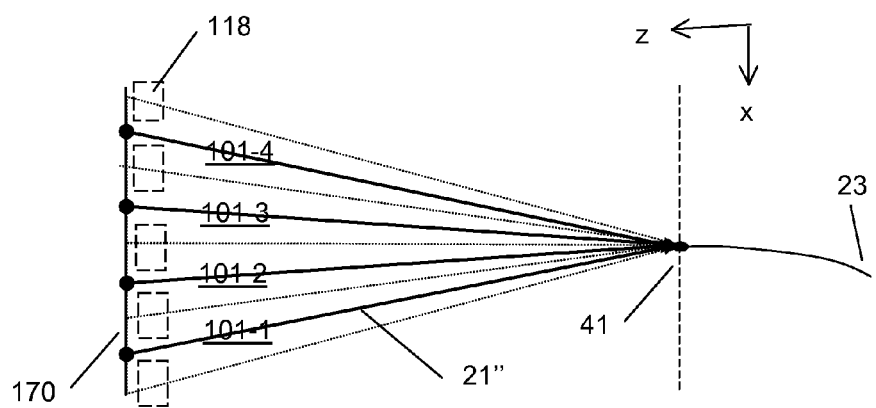
FIG. 2-B

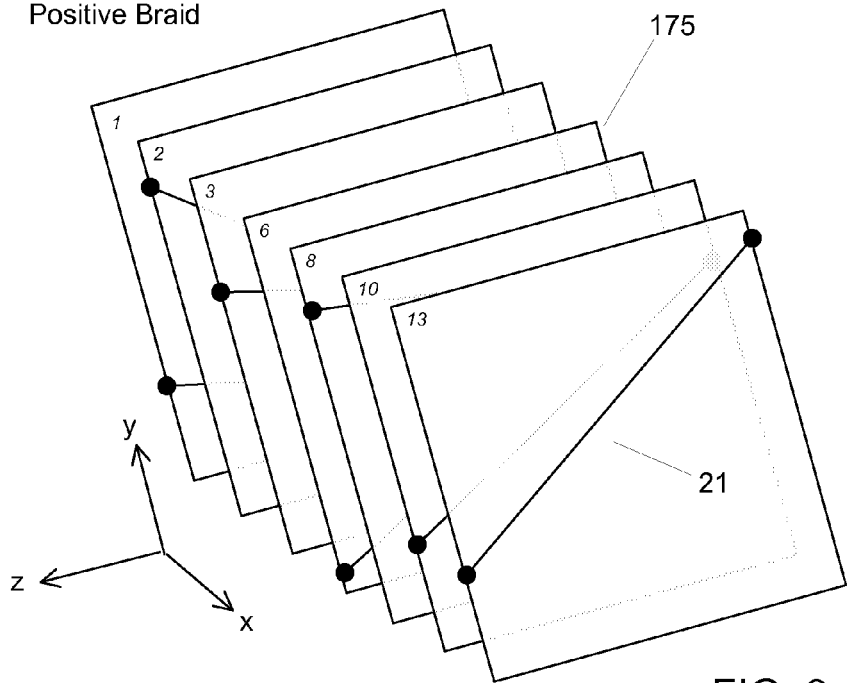
FIG. 3-A
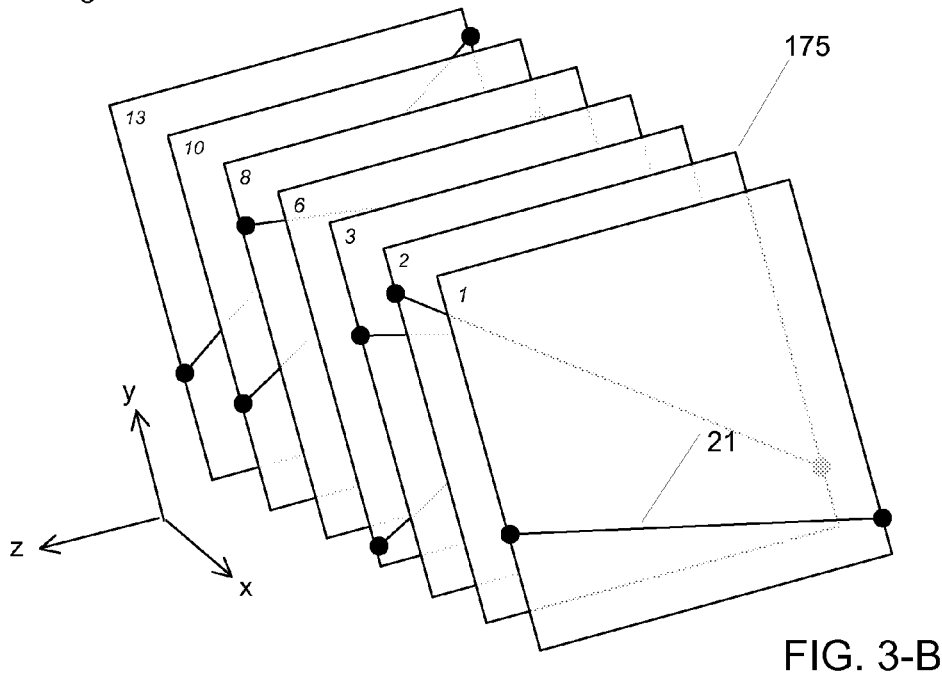
FIG. 3-B

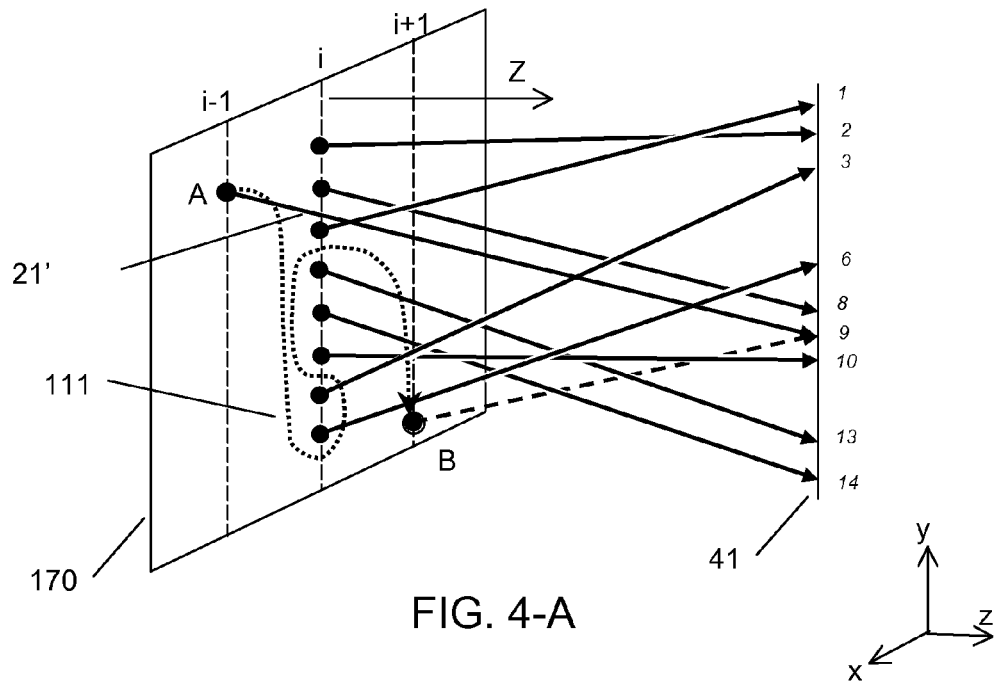
FIG. 4-A
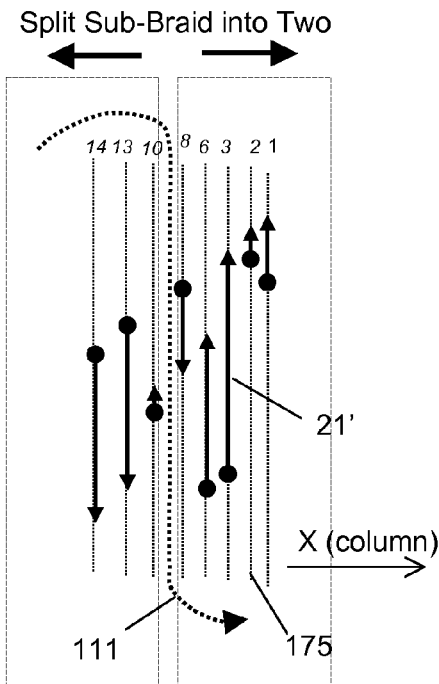
Positive Sub-Braid
FIG. 4-B
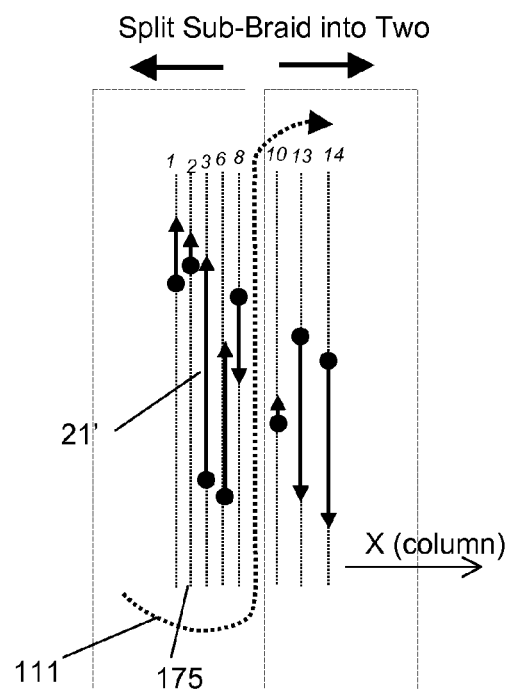
Negative Sub-Braid
FIG. 4-C

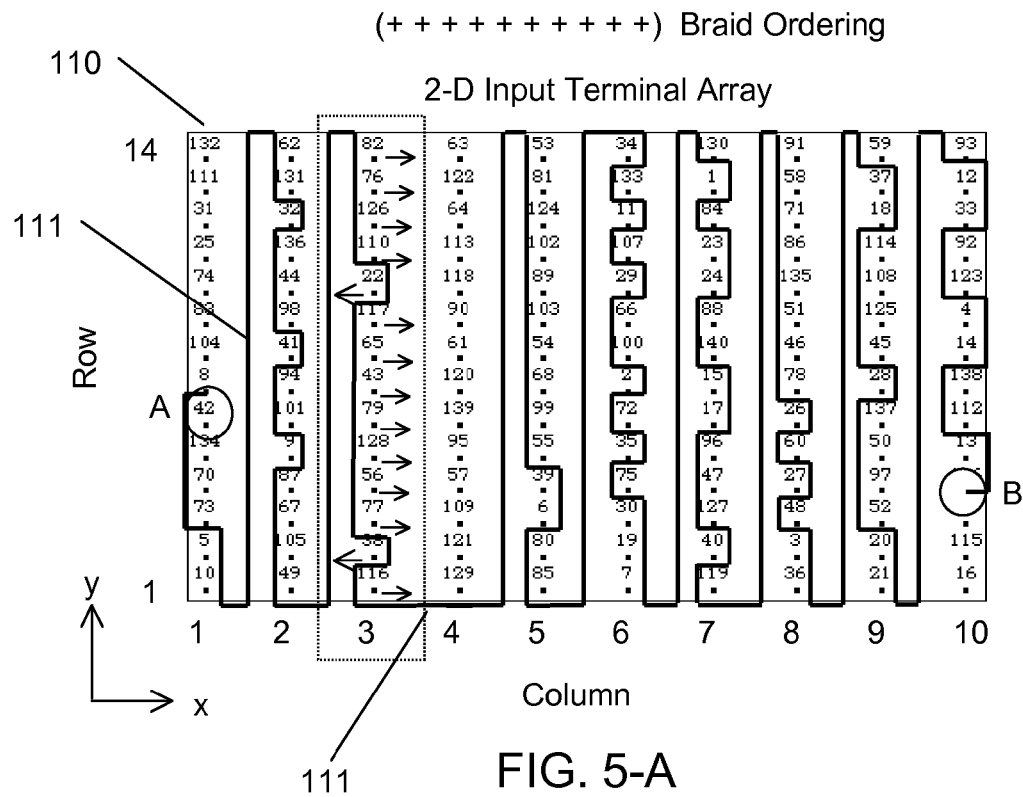
FIG. 5-A
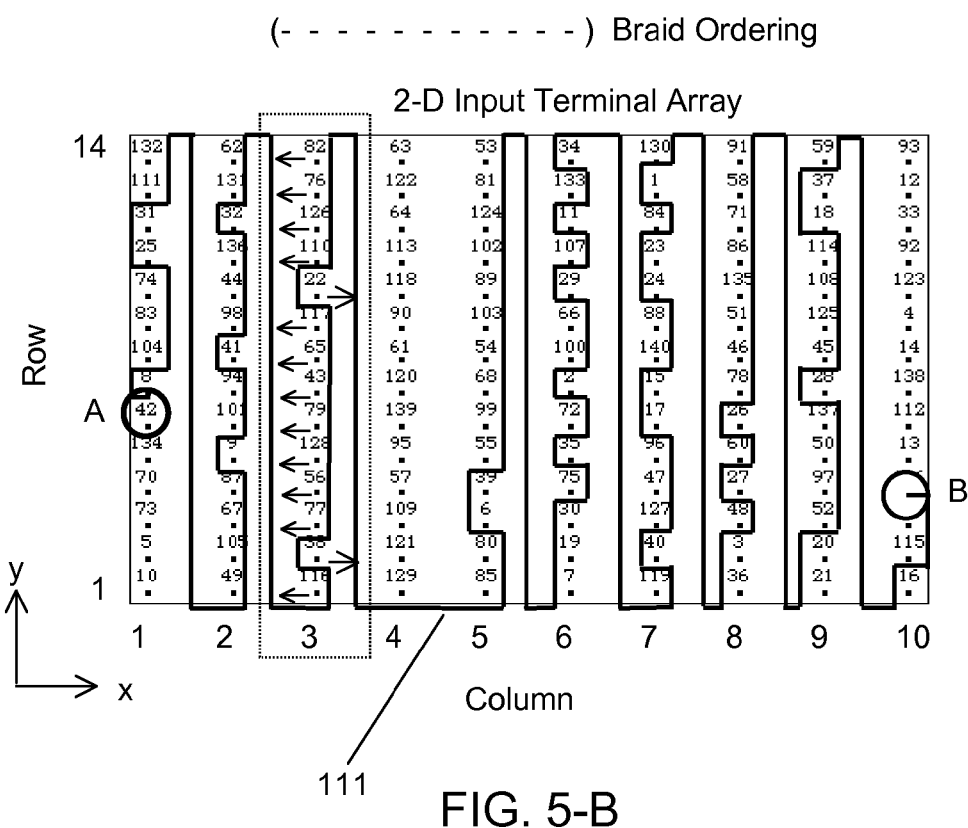
FIG. 5-B

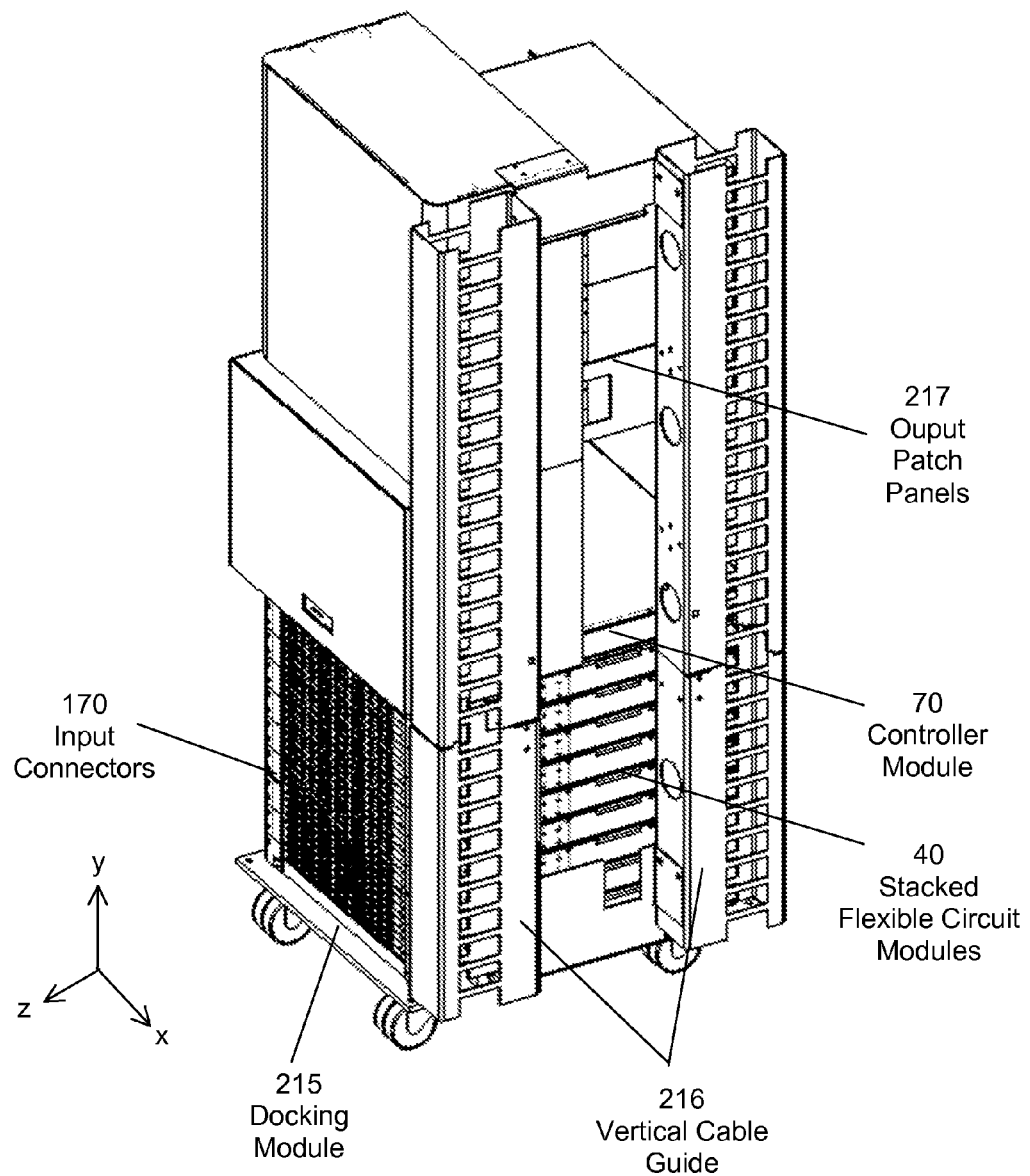
FIG. 12-A

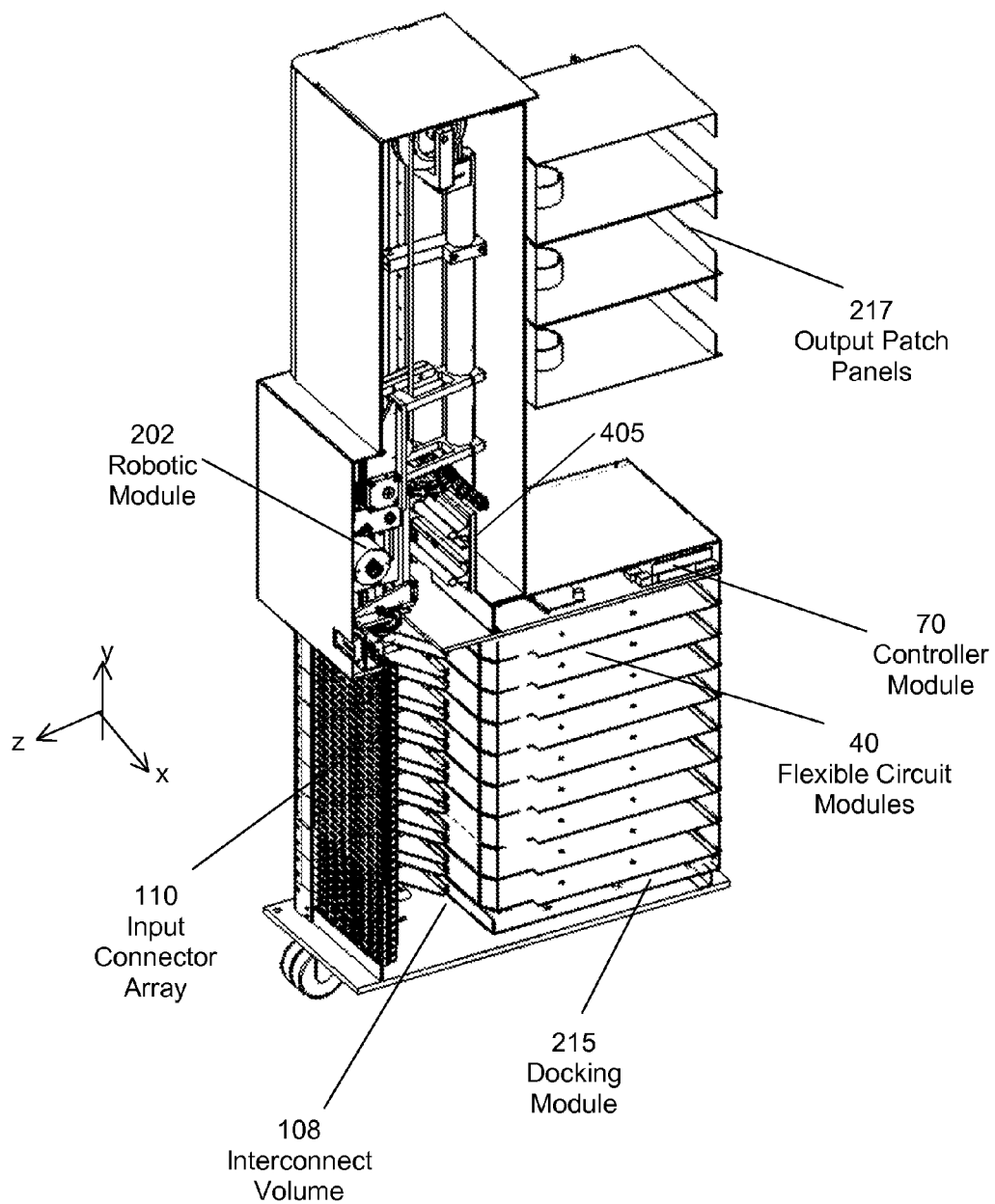
FIG. 12-B

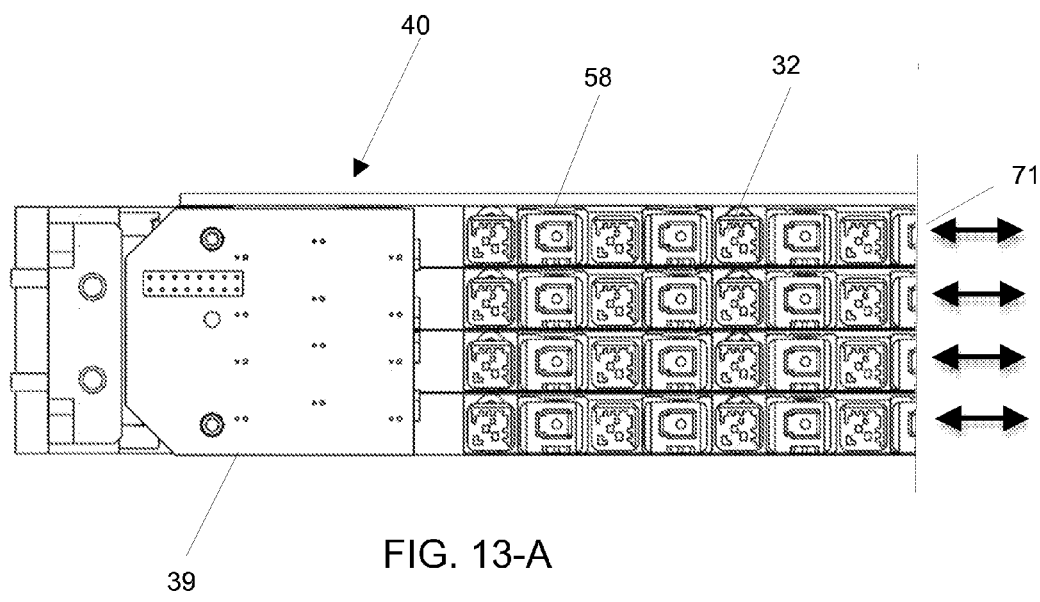
FIG. 13-A
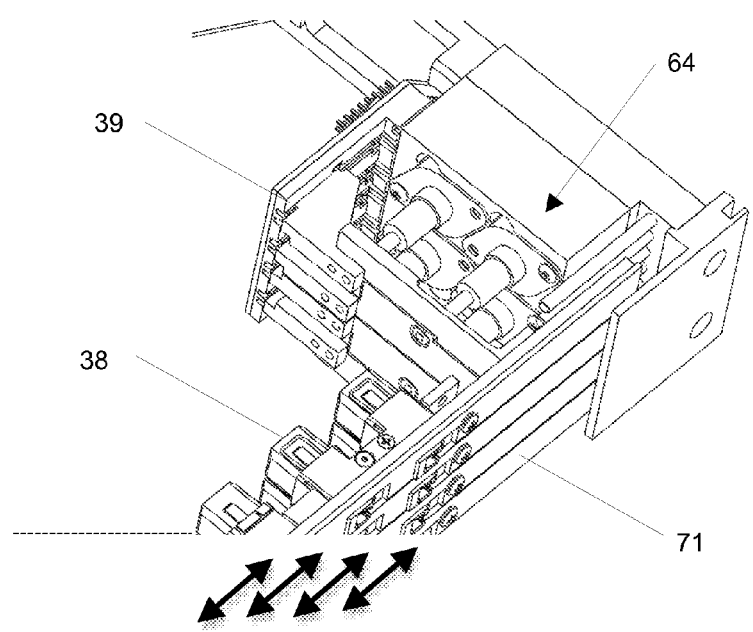
FIG. 13-B

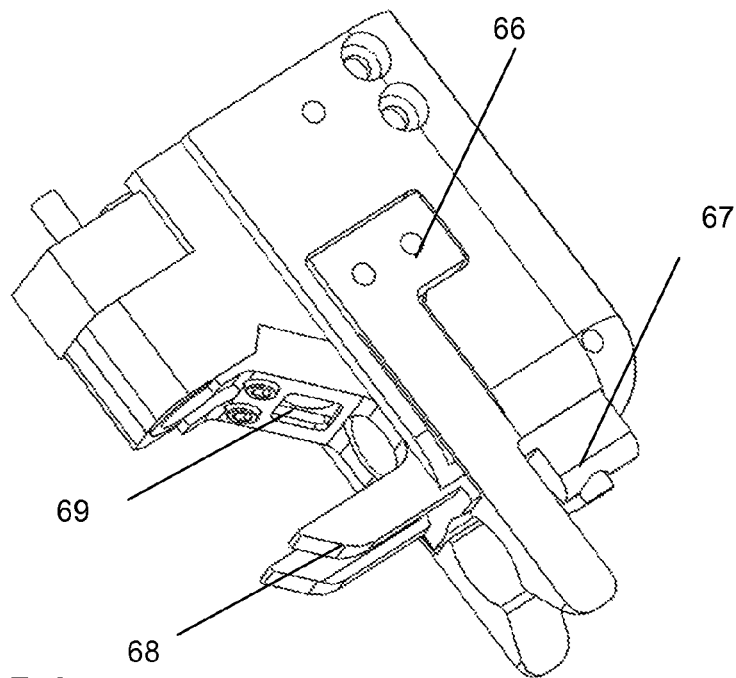
FIG. 15-A
SAGITAL CROSS SECTION
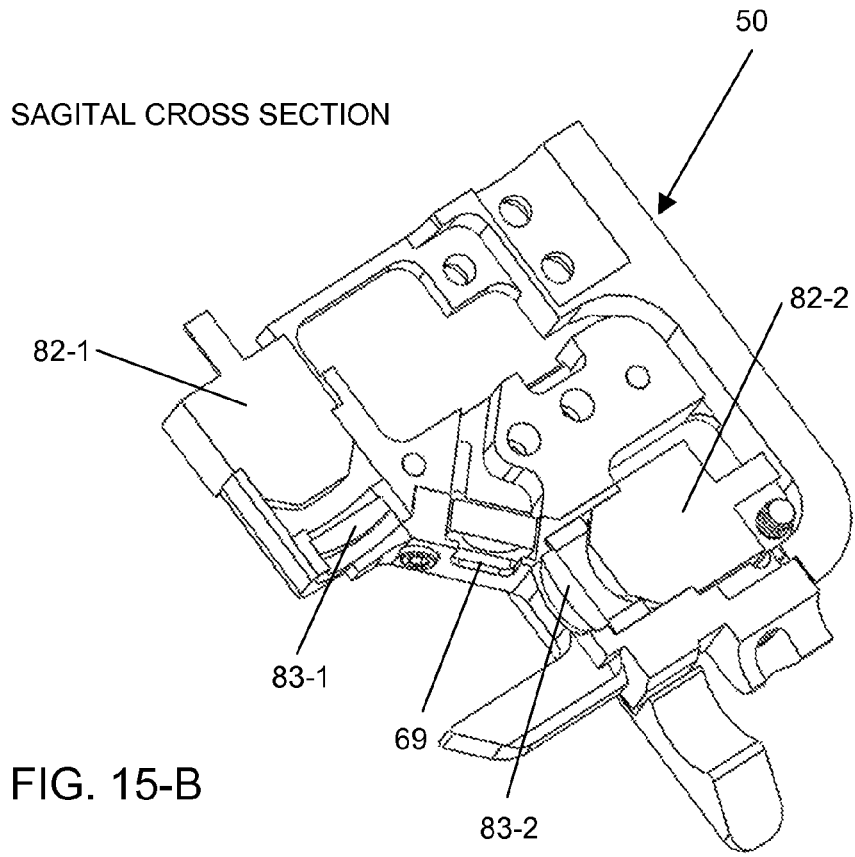
FIG. 15-B

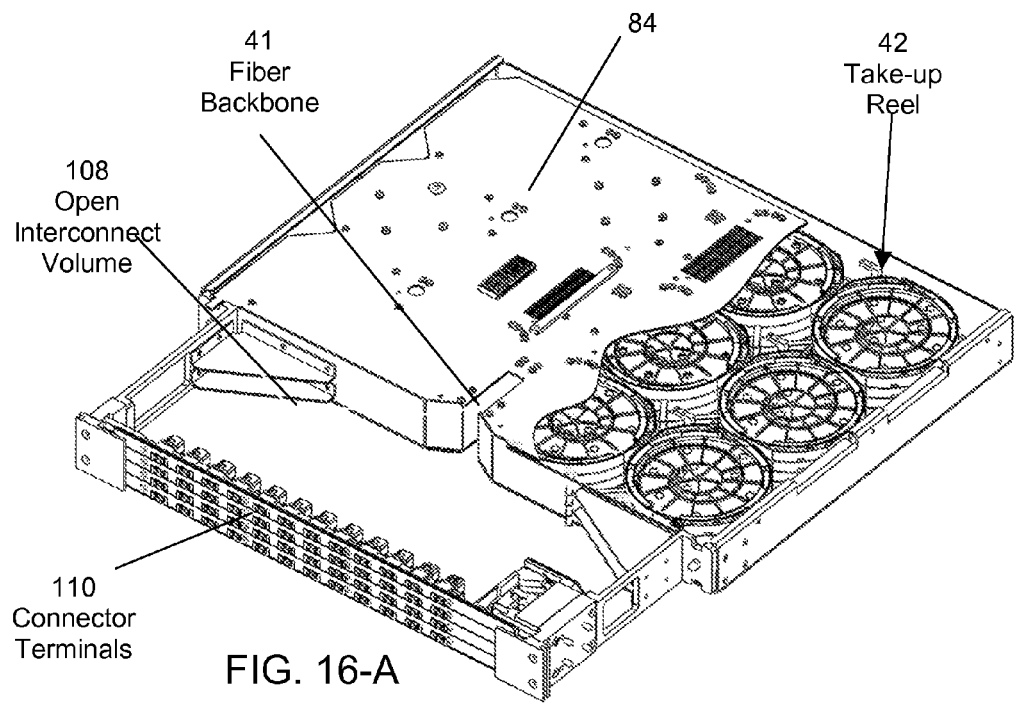
FIG. 16-A
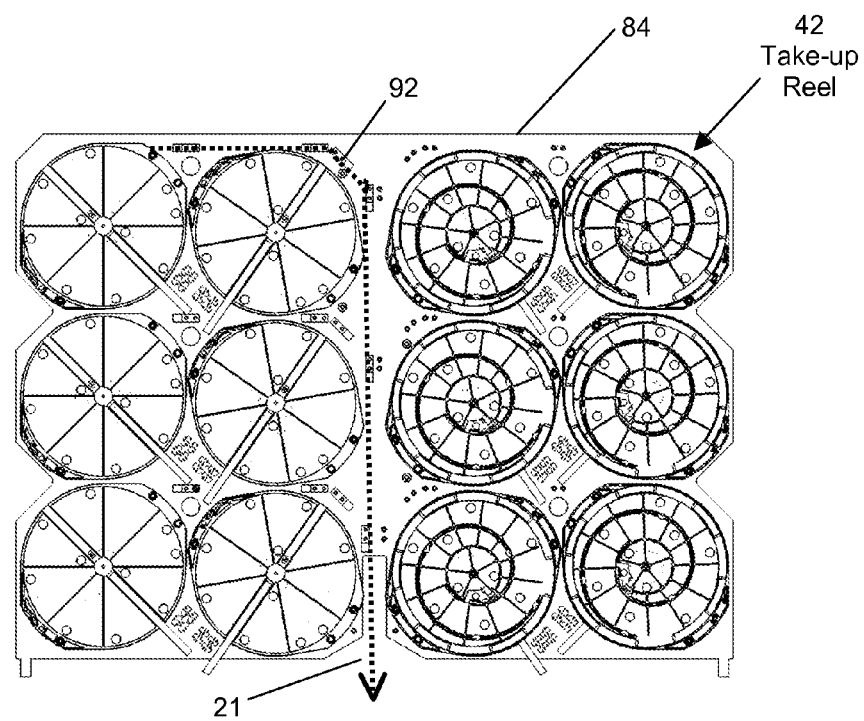
FIG. 16-B

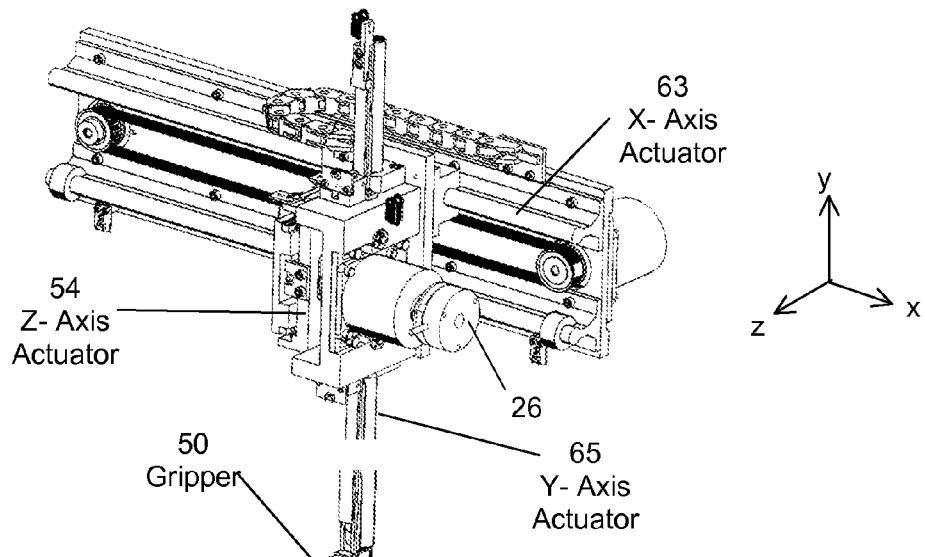
FIG. 17-A
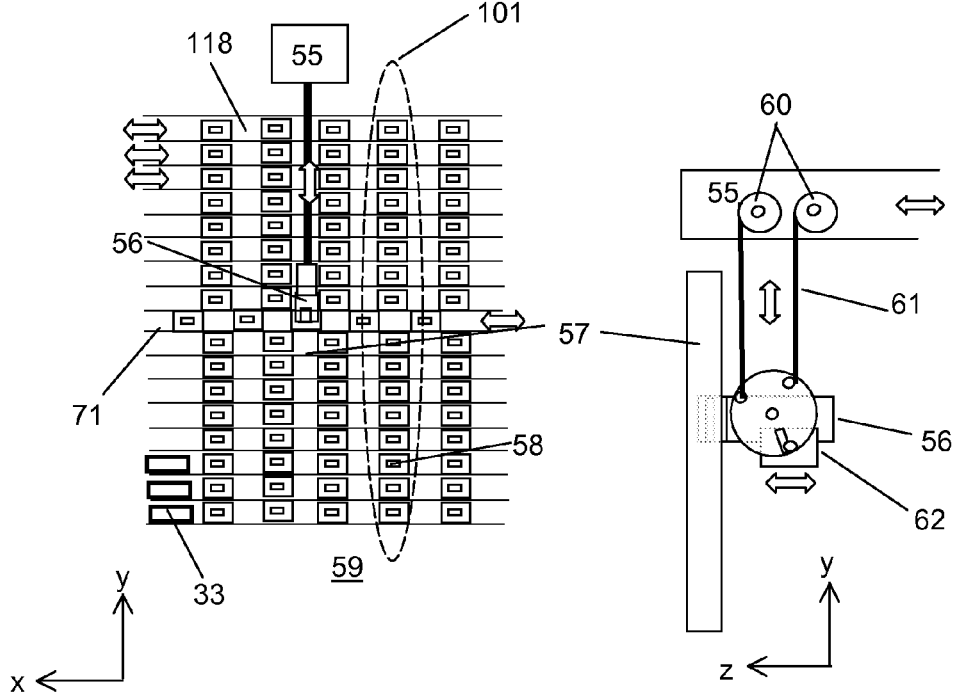
FIG. 17-B    FIG. 17-C

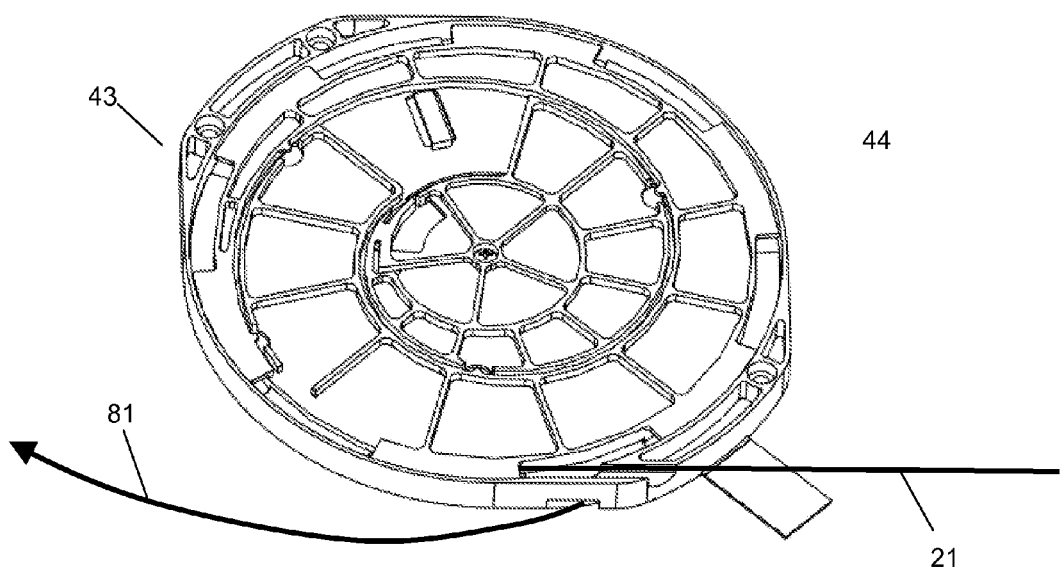
FIG. 18-A
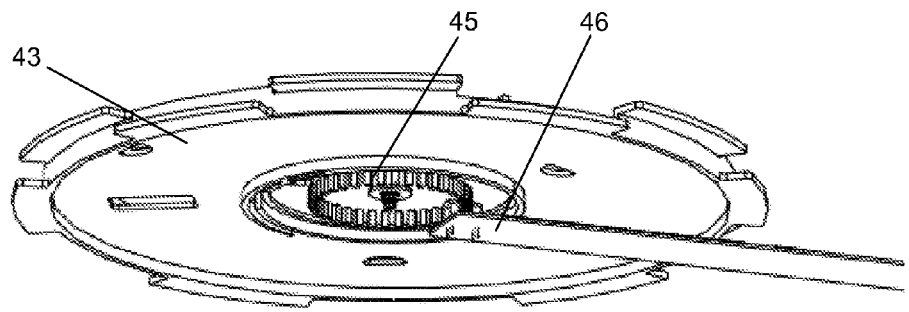
FIG. 18-B

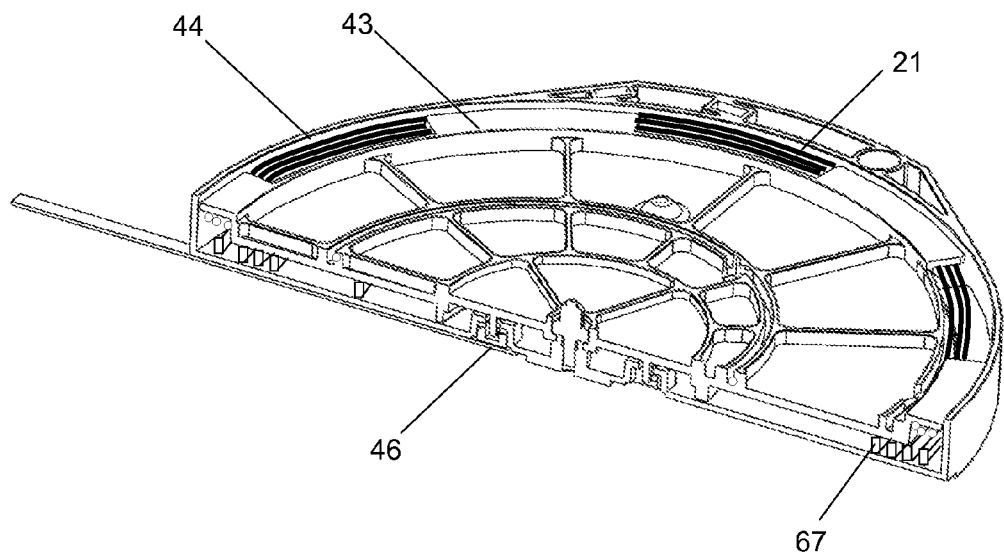
FIG. 18-C
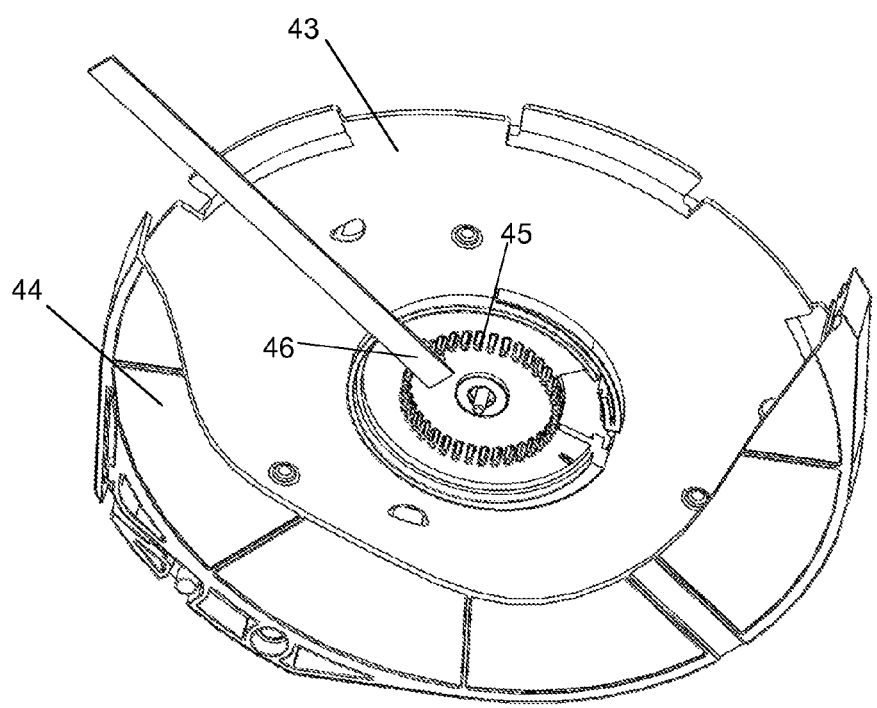
FIG. 18-D

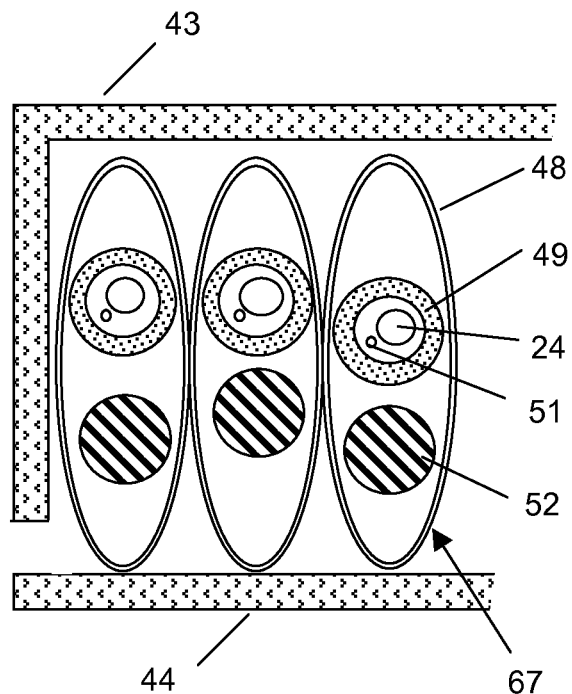
FIG. 19-A
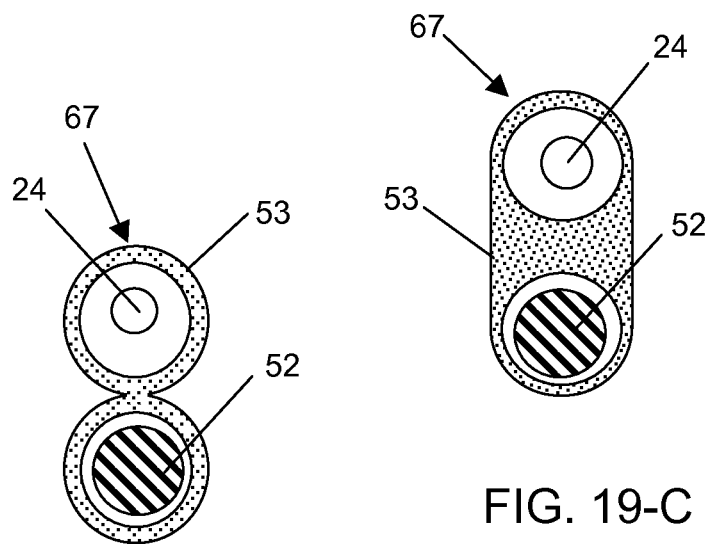
FIG. 19-C
FIG. 19-B

BRAIDED FIBER OPTIC CROSS-CONNECT SWITCHES

REFERENCE TO RELATED APPLICATIONS

This application is a continuation-in-part of U.S. patent application Ser. No. 12/196,262, filed on Aug. 21, 2008 and entitled "Scalable and Modular Automated Fiber Optic Cross-Connect Switch", U.S. patent application Ser. No. 12/196,266, filed on Aug. 21, 2008 and entitled "Methods to Reconfigure All-Fiber Optical Cross-Connects", and further relies for priority on provisional application No. 61/178,961, filed on May 16, 2009 and entitled "Braided Fiber Optic Cross-Connect Switches".

FIELD OF THE INVENTION

This invention relates to reconfigurable fiber optic cross-connect systems, and more particularly, to apparatus, systems and methods to reconfigure flexible fiber circuits at a rapid rate within a volume shared by large numbers of adjacent and intermixed fiber circuits.

BACKGROUND OF THE INVENTION

Fiber optic cross-connects and patch-panels are used to terminate large numbers of optical fibers at an array of connectors, providing a central location to manually or semi-manually interconnect network devices with patchcords. Typical cross-connect systems interconnect 100 to 10,000 network devices with complete flexibility. Connections between various types of transmission equipment, such as transceivers, amplifiers, switches and to outside plant cables destined for other exchanges, local offices, central offices, optical line terminations and points-of-presence are configured by manually installing jumpers to create communication links between specified pairs of ports.

For FTTH (Fiber-to-the-Home) and access networks, for example, the deployment of cross-connects are geographically dispersed and the number of ports is increasing significantly. Consequently, the tasks of allocating, reconfiguring and testing a fiber circuit within the network is challenging. There is significant potential for errors or damage resulting from manual changes to the physical network configuration. There is a need to automate the highly manual process of managing physical interconnections.

Robotically reconfigurable cross-connects can reduce the operational and maintenance costs of the network, improve the delivery of new services to customers and leverage costly test and diagnostic equipment by switching or sharing it across the entire network. It is appealing from a cost, accuracy and response-time perspective to configure the cross-connect from a remote network management center through network management software. The key building block of an automated patch-panel system is a scalable, high port count, all-optical cross-connect switch.

Typical networks are now installed in an incremental fashion so that fiber circuits are added to the system as needed. Prior art automated cross-connect approaches have not been modular and as such, they do not offer an upgrade path from 200 ports to 1000 ports, for example. To achieve port counts above several hundred using existing technologies, a three-stage Clos network interconnection scheme must be implemented [C. Clos, "A study of non-blocking switching networks" Bell System Technical Journal 32 (5) pp. 406-424 (1953)]. This approach increases cost, complexity and reduces optical performance because of the need to transmit through a series arrangement of three switches rather than one.

The optical performance of prior art robotic cross-connects is inferior to manual patch-panels because they introduce an additional fiber optic connection in series with each fiber circuit. A manual patch-panel requires only one connector per circuit and offers a typical loss of <0.25 dB, while the equivalent robotic patch-panel incorporates at least two connectors per circuit. This increases the loss by at least a factor of 2 above manual systems.

A series of patents by Lucent, NTT and Sumitomo disclose various implementations of large port count optical cross-connects in which fiber optic connections are reconfigured by a robotic fiber handler. For example, Goossen describes a switch utilizing a circular fiber bundle and a circular ferrule loader ring in U.S. Pat. No. 6,307,983. U.S. Pat. No. 5,613,021, entitled "Optical Fiber Switching Device Having One Of A Robot Mechanism And An Optical Fiber Length Adjustment Unit" to Saito et al., describes the use of a robotic fiber handler to mechanically reconfigure connectors on a coupling board. U.S. Pat. No. 5,784,515, entitled "Optical Fiber Cross Connection Apparatus and Method" to Tamaru et al. describes a switch in which connectorized optical fibers are exchanged between an "arrangement board" and a "connection board" by a mechanized fiber handler. A motorized means of fiber payout is further described. Related approaches are described in a series of patents including JP7333530, JP11142674, JP11142674, JP10051815 and JP7104201.

To overcome the prior art's susceptibility to fiber entanglement, Sjolinder described an approach to independently translate fiber connectors along separate, linear paths in two spaced-apart planes on opposite sides of an honeycomb interface plate ["Mechanical Optical Fibre Cross Connect" (Proc. Photon. Switching, PFA4, Salt Lake City, Utah, March 1995]. In the first active switch plane, N linearly translating connectors are driven along spaced-apart rows by actuators and in the second active switch plane, an additional N linearly translating connectors are driven along spaced-apart columns. Row and column actuators are configured perpendicular to one another. Connections are made between fiber pairs located in any row and in any column by mating connectors at any of the $N^2$ common insertion points within the interface plate. This approach requires at least 2N actuators to arbitrarily connect N inputs with N outputs. An extension of this cross-connect approach is disclosed in U.S. Pat. No. 6,859,575 by Arol et al., U.S. Pat. No. 6,961,486 by Lemoff et al. and WO2006054279A1 by J. Arol et al.

Robotic cross-connect approaches have the potential to perform substantially better from the standpoint of optical performance and maintain signal transmission even in the absence of electrical power. However, the scalability of these prior art robotic versions has been limited. The footprint of these versions scales as $N^2$, where N is the number of circuits. Considering that the central offices of today's telecommunications service providers already utilize 1000 to 10,000 port patch panels, scalability is of prime importance. Therefore, an approach scaling linearly in N would enable the cross-connect to achieve a substantially higher port density commensurate with manual patch-panels. Automated fiber optic patch panels demand scalability to port counts in excess of 1000 within the footprint of a manual patch panel, modularity and the ability to incrementally add circuits on an as-needed basis. Current technologies have been unable to achieve these varied requirements.

A new concept for fiber optic switching which achieves these requirements is based upon extensions of the Theory of Knots and Braids and the mathematics of topology to fiber optic matrix switches. This approach is described in A. Kewitsch, Journal of Lightwave Technology, August 2009, as well as the two patent applications referenced above. The unique cross-connect architectures and reconfiguration algorithms resulting from new mathematical concepts disclosed herein overcome the scalability and optical performance limitations of the prior art.

SUMMARY OF THE INVENTION

In accordance with the invention, apparatus, systems and methods based on unique Knots and Braids theoretical concepts applied to fiber optic cross-connect systems are disclosed. These systems are uniquely configured to minimize reconfiguration time and operate with high reliability. For example, a system of fiber optic strands extends between changeable terminals disposed in a two-dimensional planar matrix and a fixed linear assembly of points at a mid-span portion along the strands, each strand having unique addresses in the matrix and linear assembly planes. The gaps between vertical columns in the two-dimensional matrix are sized to permit transport of a gripper mechanism therebetween. The rows of input terminals in the two-dimensional matrix are shiftable in either direction transverse to the columns by a clearance increment adequate to permit passage of the transport mechanism and a selected strand therebetween.

This fiber optic cross-connect system thus utilizes a multiplicity of fiber optic strands disposed in a spatially coherent configuration with interconnections having different path lengths between a fixed configuration of strand guides parallel to one axis at one plane and interconnected to variable positions along a second two-dimensional plane. A modular, expandable system of rotatable reels enables the interconnections at the plane of the two-dimensional matrix to be varied while maintaining tension and more than a minimum radius of curvature on the optical fiber strands.

The disclosed fiber optic cross-connect system thus establishes arbitrary, low loss optical links between a multiplicity of input connections and a multiplicity of output connections, joined by continuous lengths of low loss, flexible optical waveguides defining vectors therebetween. Input connections are disposed in a regularly spaced, two-dimensional array coincident within a plane, the array having a number of original columns N and a number of rows M, wherein the array of input connections are in a dynamic geometric relation to one another to temporarily, reversibly and repeatedly transform to an array with N+1 partially filled columns and M rows.

In accordance with the invention, a method of and apparatus for dynamically reconfiguring a fiber optic interconnection within an interconnect volume including a large number of spatially coherent fiber optic interconnections defining vectors and spanning a regular two-dimensional array of inputs and ordered outputs are disclosed. Robotic manipulation of an affected optical fiber surrounded by a multiplicity of unaffected optical fibers is performed by traversing the unaffected optical fibers in alternating positive and negative interweaves with both column traversals and transverse row shifting alternating in direction as commanded, forming a multiplicity of separate, strictly positive or negative non-repeating subbraids. The robotic manipulation trajectory passes individually through one or more of the subbraids defining a column by programmed splitting of the subbraids into two partial sub-subbraids. The splitting is adequate for non-interfering passage of the affected fiber through the split in the subbraid. The two partial subbraids are then merged after the passage by affected fiber is complete. This interweaving concept materially reduces the time needed for reconfiguration.

Systems and methods in accordance with the invention include numerous features that facilitate assembly and operation of the reconfiguration system. Length variations in the fiber optic strands are accommodated in low elevation reel bodies mounted within shallow height modules which can be inserted in a grouped system configuration. The reels themselves provide circumferential bias on the interior fiber optic elements, because an elongated spring coextensive with the fiber optic element is wound helically within the reel, between input and output, so that the system can withdraw a length of fiber optic strand from the reel while maintaining tension to retract the fiber optic element as needed. In addition, the reel incorporates a rotational encoder in the form of regular incremental variations concentric with its central axis, which variations are optically detected to provide an accurate reading as to the amount of fiber optic strand that has been withdrawn from the reel. With these low elevation housings arranged compactly at different stacking heights (e.g. four high), a number of layers of reels can be incorporated within each module, providing a multiplicity of fiber optic strands that extend outwardly into a three-dimensional module volume, enabling reconfiguration by a gripper and positioning system. With the spring element and optical fiber coextensively disposed within a flexible or compliant housing, a spring of appropriate compliance is all that is required for maintaining the optical fiber strand under a controlled tension for withdrawal, and for subsequent return into the reel. In this system, the reconfigurable input terminals of the array extend to the wall of the system housing.

Optical fiber cables external to the system housing extend individually to separate terminals of each row, wherein rows are shifted laterally for purposes of interweaving in controlled fashion during reconfiguration. The rows of terminals feed the fiber optical cables therefrom onto resilient suspension elements which extend along the rows but permit lateral movement as the terminals are selectively shifted. Consequently, individual cables have a flexible section adjacent the terminals to which they are coupled, can be assembled into groups, extended laterally parallel to the shiftable rows, and thereafter coupled into cable harnesses extending exterior to the system. Consequently, access to particular areas of the terminal assembly for installation of fiber elements can be achieved simply by splitting apart the flexible supports as needed.

BRIEF DESCRIPTION OF THE DRAWINGS

In accordance with the invention, systems and elements comprising the optical cross-connect switch and their various combinations are described in reference to the following drawings.

FIGS. 2A and 2B illustrate an arrangement of strands suspended between a reconfigurable 2-D array of terminals to a fixed 1-D array of ports, in perspective view (2A) and top view (2B);

FIGS. 3A and 3B are the a topological representation of an interconnection braid as a multi-layer structure, in which each strand is in a different layer and ordered according to a positive (3A) or negative (3B) ordering convention;

FIG. 4A illustrates a perspective view of the interconnect volume showing an example trajectory to reconfigure a strand without entanglement and FIGS. 4B and 4C illustrate alternative braid ordering conventions for circuits within column i;

FIGS. 5A and 5B are diagrams of the geometrical reconfiguration path of an individual strand with respect to a two-dimensional input matrix when constituent strands are (5A) positively braided or (5B) negatively braided;

FIG. 12A illustrates a back perspective view and FIG. 12B illustrates a sagital view, partly in section, of the modular optical cross-connect system;

FIGS. 13A and 13B illustrate partial front and perspective views respectively of a portion of a front connector row engagement (13A) and a fragment of a row shifting actuation mechanism for a block of four input rows in a module comprising four reels;

FIG. 15A is a fragmentary perspective view a connector gripper with integral camera system and FIG. 15B is a sagital broken away sectional view of the same showing further details;

FIG. 16A is a top perspective view of a multiple level take-up reel module with four levels of twelve reels at each level and FIG. 16B is a plan view of one level of same;

FIG. 17A is a fragmentary perspective of a portion of an interconnect transport mechanism, FIG. 17B is a simplified side view showing the relationship between a transport mechanism and a matrix of terminals, and FIG. 17C is a simplified diagrammatic view of an alternative transport mechanism;

FIGS. 18A-18D depict, in fragmentary, broken away perspectives, different views of an individual take-up spool or reel for tensioning fiber strands of variable lengths and monitoring performance by an integral reel encoder;

FIGS. 19A-19C depict in cross-section various examples of combinations of optical fiber and spring elements, interior to a portion of a take-up spool, in cross section;

DETAILED DESCRIPTION OF THE INVENTION

Figure 1:
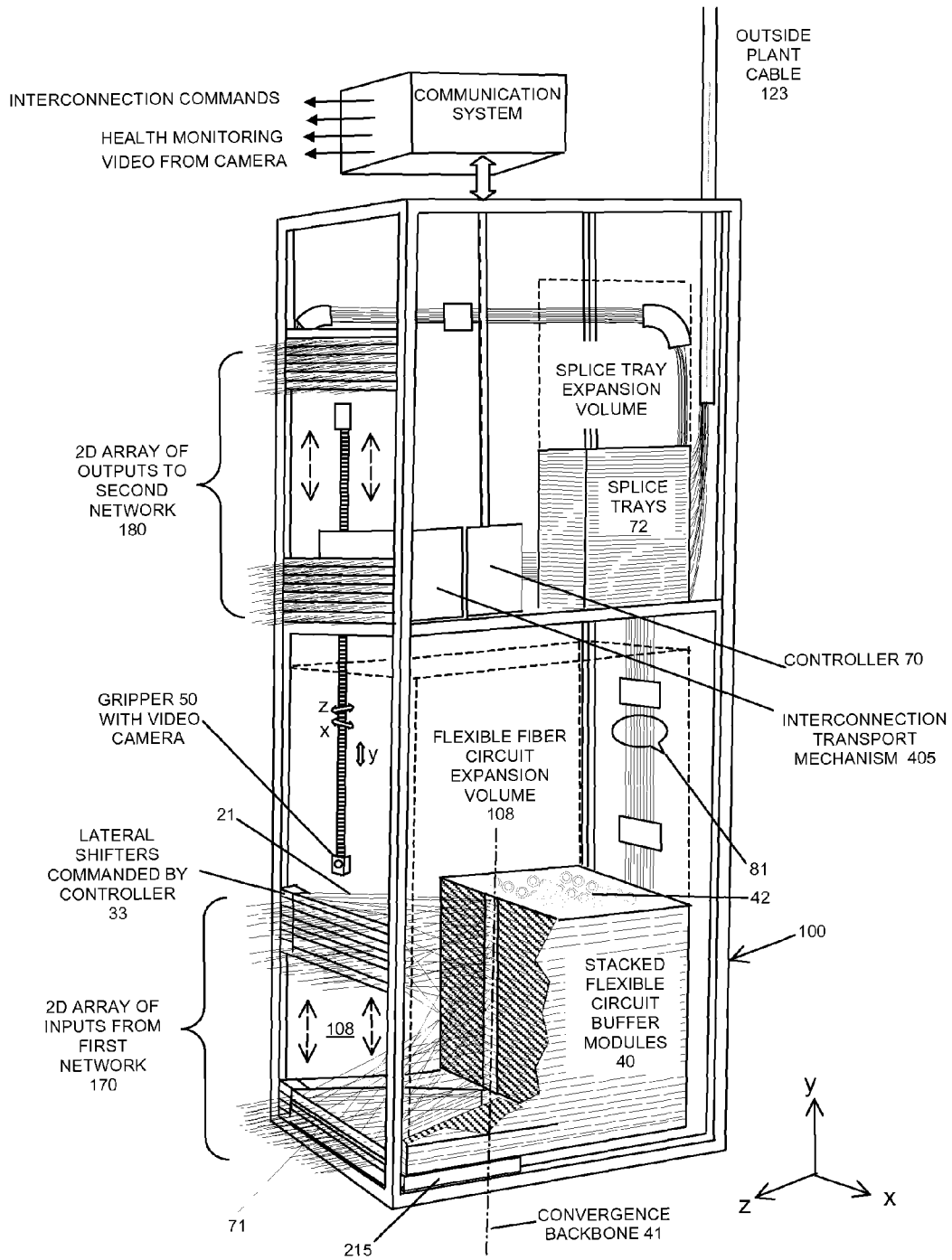
FIG. 1 is a perspective, partial cutaway view of the optical cross-connect switch system.

The all-fiber cross-connect switching system disclosed in this invention is illustrated in the partial cutaway, perspective view of FIG. 1. This system is characterized by 100's to 1000's of flexible fiber interconnection lines or strands 21 suspended between two planes and intermixing within a circuit expansion volume 108 in the system interior. The placement, ordering and subsequent physical reconfiguration of strands is based on relationships derived from the Theory of Knots and Braids. Topological algorithms uniquely describe the dynamic nature of strand boundary conditions during the reconfiguration process.

Reconfigurable fiber connections are made internal to the expansion volume 108, between a two-dimensional array of reconfigurable input terminals 170 and an intermediate, substantially one-dimensional array or convergence backbone 41 bounding the interconnect volume. The suspended fiber lines 21 therebetween follow substantially straight-line paths and define a three-dimensional arrangement of vectors directed towards the one-dimensional array 41 which is located at an intermediate plane, beyond which the fiber lines 21 exit contiguously to a modular arrangement of substantially identical, stacked buffer modules 40 housing of a group of say, 48 strands. Internal to modules 40, strand buffer or length storage elements 42 provide slight tensioning, parallel to the vectors and adequate to maintain taut fiber lines 21 in addition to retaining excess slack in the fiber lines. The tension force produced by storage elements 42 on each fiber line lies substantially parallel to the vector defining the three dimensional orientation of each fiber line.

As a result of the spatially coherent arrangement of strand interconnections, physically non-blocking, automated and software-driven reconfiguration is accomplished by linking the two-dimensional array or matrix of input terminals 170 with taut flexible fiber optic circuits 21, or strands, spanning the switch's cross-connect volume 108 and extending from a one-dimensional array of guides at the intermediate optical switch "convergence" backbone 41. Contiguous fiber optic lines 21 pass through ordered guides at the backbone 41, to a plurality of self-tensioning and slack retention means 42 within multi-fiber interconnect modules 40.

A typical optical cross-connect system in accordance with this example occupies a 19 or 23-inch wide rack and in this example contains up to 1008 input by 1008 output ports, or more. Switch terminals in array 170 can be added in fixed increments ranging from 12 to 48, for example, by installing additional flexible circuit modules 40 above any previously installed modules in the flexible fiber circuit expansion volume. The output fibers from the buffer modules 40 may be spliced to one or more multi-fiber cables 123, or terminated directly at an array of connector terminals.

In the particular example of FIG. 1, the lower section of the switch volume is substantially comprised of the reconfiguration volume 108. In general, the reconfiguration volume 108 may lie at the top, bottom, side or central section of the system 100. A central portion of the upper section is clear of obstructions to enable the robotic actuator to move, extend and park within this section while being unencumbered by the suspended fibers below. The bottom-most section (see FIG. 12B) beneath the input terminal array 170 includes at least one row of translatable docking ports or parking ports in a docking module (215 in FIG. 12B) adjacent the flexible circuit modules 40 to facilitate exchange of fiber lines 21 between and under the populated terminals. The polished fiber end-face of a connector can be cleaned prior to insertion at terminal array 170 by use of an integrated fiber end-face cleaning module (not shown in FIG. 1) which may be integrated within the interconnect transport mechanism 405. The cleaning module may comprise a fiber cleaning fabric ribbon in spooled form and a drive mechanism which automatically moves the fabric relative to the end-face, thereby cleaning the fiber end-faces in a non-wearing fashion.

This cross-connect system 100 is comprised of a combination of interchangeable modules to provide desirable characteristics of modularity, scalability and versatility (FIGS. 12A and 12B). As shown in these figures, by way of example, the modules include a multiplicity of stacked flexible fiber optic circuit modules 40 populating an input connector array 110, a robotic module 202 coupled to the interconnection transport mechanism 405 a controller module 70, a docking module 215, vertical cable guides 216 and output patch-panels 217. For further details as to system geometry and operation, reference can be made to the above-referenced patent application Ser. No. 12/196,262.

The row-translatable, input terminal portions of the flexible circuit modules 40 are detailed in FIGS. 13A and 13B and are comprised of stacked rows 71 of connector terminals 58 for terminating fiber stands 21 (not shown here for clarity) and individually shiftable by means of a removable row shuffle actuator 64 subassembly. The excess lengths of fiber strands 21 are retained on take-up spools in the buffer modules 40 as is described in more detail below. Within the interior interconnection volume, unique barcodes 32 (FIG. 13A) are applied adjacent each terminal or connector receptacle 58 to enable the interconnection transport mechanism to determine its absolute position within the interconnect volume 108 (FIGS. 1 and 12B). The fiber interconnect module 40 further includes optical position sensors on a printed circuit board 39 (FIG. 13B) to unambiguously and independently reference the position of each row 71 (FIG. 13B) of terminals 58 (FIG. 13A).

A multi-functional gripper 50 (FIGS. 1, 15A and 15B) is transported by the interconnection transport mechanism 405 to carry a strand or fiber line 21 to a different input terminal receptacle 58 in terminal array 170 (FIG. 1). Any of the fiber circuits 21 are thus arbitrarily reconfigurable by engaging a selected circuit by this programmably moveable gripper 50, which can reposition the connectorized fiber optic circuits 21 moving within interstitial regions adjacent the interior surface of the array of switch terminals 170 (FIGS. 1 and 2). Non-interfering reconfiguration is accomplished by following a non-blocking path computed by the controller 70 (FIG. 1) and based on knowledge of the vectors and configuration of all intermediate lines 21 (FIG. 1) intermixed within the common interconnect volume 108 as described in the parent applications. Referring also to FIG. 15B the gripper includes a spring clip 66 (FIG. 15A) element to retain any connector 34 and seat this connector within support guide 67 during transport. The gripper 50 also includes image sensors 82-1 and 82-2 with imaging lenses 83-1 and 83-2 and integral LED light source 69 for use in vision alignment and barcode recognition. Rigid gripper extensions 68 are used to depress a latch retaining connector 34 within terminal 58. As seen in FIG. 12, the connector 34 includes a multi-segment clip body 35 with a miniature, unique barcode 32 attached to top surface for unambiguous identification of all fiber strands 21. The clip body 35 includes two spaced apart notches 36 provided to separate latching positions during engagement of the connector 34 into terminal 58 (FIG. 13A).

Figure 14:
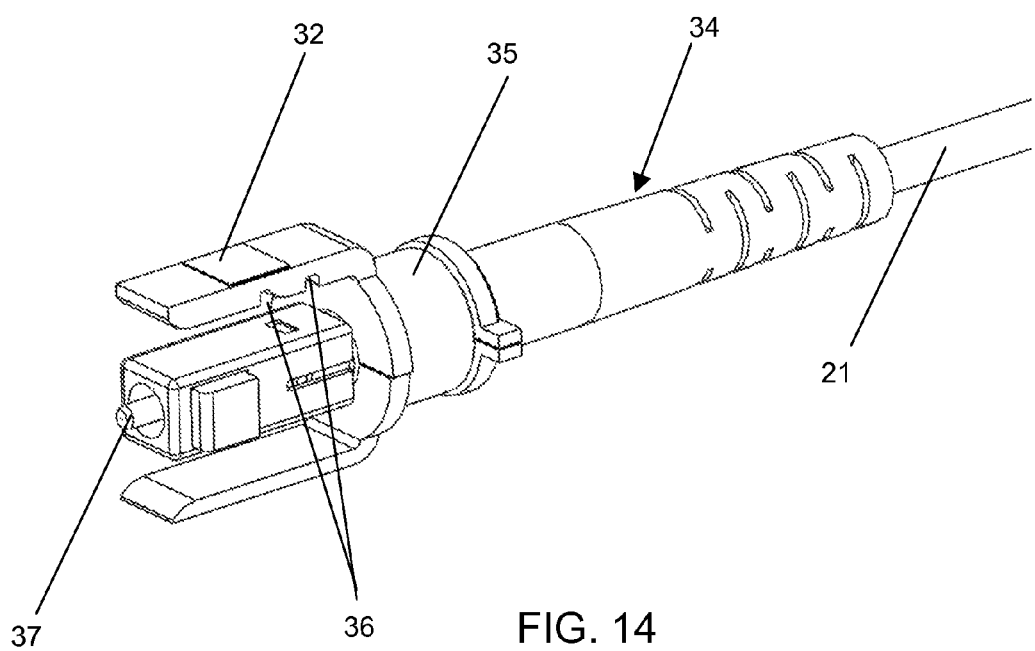
FIG. 14 is a fragmentary perspective view of the internal fiber optic connector which facilitates robotic actuation, machine-vision recognition, and two state engagement of individual cable elements.

This gripper 50 thus may provide for machine vision alignment and inspection, electrical monitoring and power monitoring. The gripper is attached to the end of the y-axis linear actuator 65 (FIG. 17A). The integral cameras 82 (FIG. 15B) capture and relay video data to processor 70, this data being used to direct the interconnection transport mechanism 405 during active alignment of gripper relative to a terminal of input array, or when reading absolute fiducial marks such as two-dimensional DataMatrix barcodes 32 adjacent each internal switch terminal 170 or two dimensional barcodes 32 (FIG. 14) on connector 34. For example, this video data is processed in real time by pattern matching algorithms residing in the controller module 70 (FIG. 12B). Pattern or geometric matching algorithms are used to determine the physical center of each connector terminal 34 located on the interior side of the front panel terminal array 170. The gripper is aligned in x, y, z directions with a selected fiber strand connector 34 utilizing closed-loop feedback to the motors driving the x-axis actuator 63, y-axis actuator 65 and z-axis actuator 54 (FIG. 17A).

Gripper 50 can utilize a semi-rigid, stiff spring element 66 (FIG. 15A) to clip or engage a connector 34. In certain instances, it may be advantageous to concurrently make electrical contact with a conductive element running along the length of the suspended fiber circuit 21 as a confirmation of proper engagement. The gripper is potentially connected to electrical ground, for example, so that when a fiber circuit is attached to the gripper, an electrical path can be established through multiplexed electronic sensing circuitry. A change in voltage across the electrical path then indicates whether the connector is properly seated and held within gripper 50.

In a particular example, referring again to FIG. 14, the connector body is held within a die-cast metal clip 35, the clip including retaining features or grooves 36 so that a spring element engaging these grooves can rigidly hold the connector 34 onto a mating terminal. Before disconnecting a fiber circuit from its mating receptacle, the completion of a low resistance electrical path can be confirmed to ensure the circuit 21 is properly seated and engaged within the gripper 50. Alternatively, the clip or connector body may include a miniature barcode 32 attached thereon that is identified by a miniature camera 82 (FIG. 15B) during the disengagement (or engagement) process. Barcode reading and pattern matching algorithms are utilized to confirm proper clasping and unclasping of the connector 34 with gripper 50.

The gripper 50 is attached to one end of the y-axis linear actuator 65 (FIG. 17A), which is, for example, a stiffened linear shaft fabricated of aluminum, stainless steel or carbon fiber composite. Alternatively, the linear actuator may consist of a series of extendable, telescopic tubes to reduce the overall height of the system when the gripper is withdrawn from the interconnect volume.

In an alternative example, FIGS. 17B and 17C illustrate a second robotic approach to positioning based on a gantry that lowers a shuttle 56 or fiber transporter with translatable gripper 62 attached via support cables 61 down the column track 57 onto a particular circuit connector 58 to be reconfigured. The use of cable actuation through the support cables enables the length of the monolithic, rigid y-axis actuator 65 to be reduced relative to FIG. 17A, because the shaft length of y-actuator does not need to rise above the interconnect volume 108 (seen in FIG. 12B) before, during and after reconfigurations. The actuator cables 61 are retained on motorized reels 60 that raise and lower the shuttle 56, as well as translating the gripper along the z axis to engage or disengage the circuit attached to the front adapter connector. Alternatively, the y axis actuator can utilize telescopic tubes, or other mechanical approaches developed for extendable booms, to reduce the vertical clearance needed when the y-actuator 65 (FIG. 17A) is fully withdrawn above the interconnect volume.

Each row of connectors 71 on the lower input array illustrated in FIGS. 1 and 14B can independently shift laterally on actuation by row shifters 33 shown symbolically in FIG. 17B and described in FIGS. 1 and 12B in the previously referenced parent applications under the command of controller 70. Row shifting enables the implementation of unique reconfiguration algorithms based on coordinated motion of the gripper 50 and the row translations to "weave" a non-repeating braid arrangement of fiber strands.

Reconfiguration is initiated by a user or external software client by entering a simple reconfiguration commend, reading in a file containing a series of reconfiguration instructions, or via a standard interface protocol such as TL1 or SNMP (Simple Network Management Protocol). The server or controller system 70 (FIG. 1) processes these commands, based on the current state of the database of interconnection vectors and the location of the origination and destination terminals, to compute the weaving code required for the multi-step, Braid theory-based reconfiguration process. Thereafter, the motion of interconnection transport mechanism 405 is initiated. The multifunctional gripper 50 disengages and moves a specified fiber line, in a fashion synchronized to be in timed relation with the programmed, independent translation of each row comprising the two dimensional array of terminals 170 along the x axis. Fiber lines retain substantially straight-line paths for any number of arbitrary reconfigurations. The vector undergoing reconfiguration maintains a proper orientation relative to surrounding vectors such that entanglement is avoided for any potential reconfiguration.

In the cross-connect system disclosed here, input terminals are connected to output fibers through internal connections that are robotically reconfigured. A reconfiguration of one port first requires that if the internal destination port 58 is currently occupied by a connector 34, this connector must be vacated to make room for the new fiber connection. This process makes temporary use of a holding, docking or parking port, for example, within docking module 215 below and adjacent the flexible circuit modules 40 (FIG. 12B). If the destination terminal or port is not vacant, the port reconfiguration is preceded by the step of moving any fiber strand 21 within the destination port to an empty terminal 58 (FIG. 17B). In general, the number of internal input terminals 58 will be larger than the number of output fibers 81 (FIG. 1) because of the addition of docking and/or parking ports.

By convention, the figures referenced herein depict cross-connect systems in which the columns (y direction) are vertical and the rows (x direction) are horizontal. In general, columns and rows can be oriented either vertically or horizontally, depending on the size and form factor requirements of the particular application. For example, for height-constrained applications, the y axis may be oriented horizontally.

When a batch-process of multiple reconfigurations is executed by the controller 70, the optimal reconfiguration process in terms of speed does not necessarily reconfigure one port at a time in the order dictated by a batch process file. Instead, the entire set of reconfigurations should be processed such that an optimal sequence of reconfigurations is performed based on a least path optimization process. This process analyzes the current configuration and the availability of vacant nearest neighbor ports to determine the most efficient reconfiguration scenario (i.e., fastest).

In a particular example, the port configuration file resides within the memory of controller 70. The system receives an instruction in which a first strand currently attached to a first input or origination terminal 58 is to be connected to a second input or destination terminal. The reconfiguration tile in memory is read to determine if the second input terminal must be first vacated. If so, the second strand corresponding to the second input terminal is moved to the nearest empty port. Once the second input terminal is empty, the first strand can be moved to this terminal to establish the new link. The second strand remains available for future operations.

Knot and Braid Representations of Strands

Because of multiple geometrical relationships and constraints, the arbitrary but spatially coherent reconfiguration of any fiber line within a multiplicity of surrounding fiber lines cannot be performed except under computer control. The spatially coherent set of strands or links is represented by the group of positive and/or negative non-repeating braids. The signs of the braids are dictated by a given ordering convention that is maintained during all reconfigurations during the lifetime of the system. For example, all subbraids within the interconnect volume may be positive, negative, or some combination thereof. To accomplish this, reconfiguration methods based on the Theory of Knots and Braids are disclosed next.

Arbitrary reconfigurations are achieved, referring now to FIG. 1, by translating the origin of the vector associated with a fiber line 21 through the region of interconnect volume 108 immediately adjacent to the two dimensional array of terminals 170 (seen in FIG. 2). From the origination terminal, this moving vector weaves through the surrounding space of vectors in a non-interfering, column-by-column fashion to the desired destination terminal. Translation across, up and down columns 101 is directed by electronic positioning controls generated by controller 70 to activate the interconnection transport mechanism 405.

Reconfigurations of flexible, yet taut, fiber lines 21 are made internal to the interconnect volume 108 by disengaging, translating and re-engaging fiber line 21 connectors 34 adjacent the internal surface of the two-dimensional input array 170 of internal terminals 58 under the control of the interconnection transport mechanism 405, movable along three orthogonal axes to maneuver around surrounding suspended fibers 21.

The interconnect volume 108 is bounded on the input side by the array of terminals 170 and on the opposite side by a substantially one-dimensional array of fiber through-ports or guides in substantially linear alignment along a fiber backbone 41 lying at an intermediate plane within the cross-connect system. Each strand 21 passes through a unique and fixed guide at a different point midway along the strand length.

The fiber strand interconnection volume 108 thus lies between two planes spaced apart by a distance L. The first plane coincides with the input terminal array 170 and the second plane coincides with the convergence backbone 41. The internal connections made to the input terminal array are reconfigurable. While not depicted graphically in FIG. 2, strands 21 terminate in reconfigurable connectors 34 that mechanically and optically latch to mating connector receptacles 58 at input connector array 170, as shown and described in greater detail in the referenced, previously filed parent applications.

Reconfiguration algorithms are calculated based on a state representation of the spatial relationships between an intermixed yet spatially coherent arrangement of physical interconnects. The group of fiber strand interconnections is mathematically represented by a Braid Group, with an associated algebra necessary to represent the various geometrical relationships and operations on the interconnect strands comprising the braid.

Each fiber interconnect 21 suspended between the input plane 91 and intermediate plane 93 is mathematically equivalent to a strand or vector joining two points in opposite planes. The geometric relationships and boundary conditions of strands change arbitrarily as a result of reconfiguration. To avoid physical knotting or tangling of these strands, which prevents subsequent reconfiguration, the crossing characteristics in relation to other strands must be determined. One end of a particular strand at the input plane is maneuvered at its endpoint (the physical embodiment of its boundary condition) such that the strand passes through the interconnect volume without entangling other strands.

A fiber optic connection at the front input terminal array 170 is reconfigured by physically translating its proximal endpoint 22 within the interstitial gaps 118 between the arrayed interconnections terminating at input terminals 58. During reconfiguration, endpoint 22 remains close to the plane of the input array, travelling within interstitial gaps 118 between strands to allow physical access for the gripper 50. At the other end of the interconnection volume 108 the interconnects' distal endpoints 23 extend through the intermediate array 41 to the output fiber assembly 81 (FIG. 1) and the configuration of endpoints 23 remains fixed.

The multiplicity of strands can realize an infinite number of configurations. Knotting of strands is possible if the interconnect paths 21 are spatially indeterminate and if the length of the strand is greater than a straight-line path. Instead, least-path, variable length interconnects are provided by retaining excess fiber lengths outside the strand mixing volume to prevent knotting. Fiber tensioning and storage modules 40 are disposed opposite the intermediate plane 41 and adjacent to the strand volume 108. In this manner, strands 21 follow substantially straight-line paths, defining vectors connecting the input 170 and intermediate 41 arrays.

Topological Ordering Rules and Reconfiguration Algorithms

Geometrical "order" of strands within the interconnect volume is achieved by interconnecting the 2-D input array of strand terminals to a 1-D intermediate array of strand guides. The input array consists of a columns by b rows and the intermediate array consists of n=a·b rows. Order is reflected in the coherent, that is, correlated spatial relationships between strands. As a result of this order, the strands collect into separated columnar zones or "subbraids" that are physically independent of one another. Arbitrary interconnections are reconfigured by crossing through each independent, orthogonal zone individually, in a sequential fashion until a destination zone is reached.

As an example, the interconnect strands between a 4×4 input terminal array 170 and a 16×1 port intermediate port array 41 is shown in FIGS. 2A and 2B. The strands 21 follow straight-line paths between the input plane 91 and intermediate plane 93. The mapping of the 2-D inputs to a 1-D array performs the mathematical equivalent of "combing" the interconnection braid, to form independent, spaced-apart subbraids. The interconnection geometry retains a deterministic arrangement, despite the potentially arbitrary state of interconnections. The entire interconnection braid is subdivided into separate, independent subbraids or zones 101-1, 101-2, 101-3, 101-4 originating from each column of input terminals. That is, $B_n=(t_1, \ldots t_n)$ reduces to the subbraid group $B_a=(t_1, \ldots t_a)$, wherein a is the number of TOWS.

For a given reconfiguration process, interconnections are inserted and maintained in the proper order such that each subbraid is non-repeating; that is, any two of its strands cross at most once. Strands do not span more than one zone in any final interconnect configuration. This configuration ensures the strands remain disentangled. The strands 21 of the non-repeating braid are overlaid back to front without intertwining. From a topological perspective, strands lie within separate layers, eliminating the proclivity to tangle. Each strand is topologically equivalent to a "page" in a book, where pages are ordered in an ascending (i.e. positive) or descending (i.e. negative) sense, and each subbraid is a "chapter" of the book.

The algorithms to re-arrange any interconnect in a non-blocking fashion require knowledge of each interconnect's intermediate array row m and the sign convention of the subbraid in which it resides (i.e., positive or negative). To move a strand n within column i to a column j, the subset of strands in column i lying between strand n and strand j must be identified, after which the proximal endpoint of this strand traces out a continuous path passing below the subset of strands with m>n and passing above the subset of strands with m<n.

The following rules govern the non-blocking circuit rearrangement process:

(I) Fiber circuits 21 should follow substantially straight-line paths between the two-dimensional input terminal array 170 and the one-dimensional port backbone 41.

(II) Fiber circuits 21 should span only one zone 101 for any particular configuration of boundary conditions.

(III) Each fiber circuit must be associated with a unique "address" relating to its elevation at the fiber backbone 41.

(IV) A fiber circuit must be inserted or removed from a column only in an ordered fashion based on each circuit's "address" within the fiber backbone. Circuits within a particular zone may be thought of as occupying separate "layers" within the zone along vertical planes joining the input column and the backplane. These layers are ordered sequentially based on the "address" of the fiber circuit within.

Stated differently, the movement of a particular fiber circuit 21 across an intervening column or braid of interconnections requires knowledge of each fiber circuit's "address" m and "order" (positive or negative). To move a circuit n within column i to a column j, the subset of circuits in column i that lie between circuit n and column j must be identified. Circuit n should move below the subset of fiber circuits with addresses m>n and above the subset of fiber circuits with addresses m<n, on a column-by-column basis.

The set of all N switch interconnections forming the spatially coherent switch state, with a particular set of boundary conditions, is represented by an N-stranded braid. Practically, the interconnections must remain knot-free. Mathematically, this means the interconnections correspond to braids comprised of strands with $|x|<=1$, which are conventionally called positive (x>0) (FIG. 3A) or negative (x<0) (FIG. 3B) non-repeating braids. Positive denotes that the braid only has positive crossings, that is, the front strands have a positive slope. Each strand 21 can be thought of as residing in its own layer 175, which can be individually peeled away from other layers.

The collection of strands 21 comprising the non-repeating braid are represented as a sequentially ordered series of layers 175, wherein layer identifiers "1", "2", "3", "6", "8", "10", and "13" denote the elevation of strands at the 1-D backbone

41. In FIG. 3A, the layers are arranged in ascending order with spatial coordinate x, defining a positive braid. In FIG. 3B, the layers are arranged in descending order with x, defining a negative braid. Due to its non-repeating, layered braid structure, layers are independent and individual layers can be moved or removed from the braid without entanglement.

Arbitrary reconfiguration of circuits having the geometry disclosed herein and following the rules outlined above proceeds in a non-blocking and non-interfering fashion. Reconfiguration only requires knowledge of the particular interconnection braid at the time of reconfiguration and is independent of prior switch history. This rule-based algorithm remains valid for any number of switch reconfigurations and the ordering conventions should be unchanged during the operational lifetime of the system.

In a simplified example, the reconfiguration of a circuit passes from subbraid i−1 to subbraid i+1 by traversing an intervening subbraid i (101-i) in a manner that avoids knotting of circuit 21' (FIG. 4A). In the initial configuration, the circuit 21' undergoing reconfiguration is initially attached to terminal A within subbraid i−1, and is moved to terminal B within subbraid i+1 of input array 170 in a non-blocking fashion.

In the further example illustrated in FIG. 4A, the strand successfully passes from column i−1 to column i+1 by traversing an intermediate column i in a manner that avoids entanglement. If the strand were reconfigured by moving the proximal end of strand i from a terminal A to a terminal B along a direct straight-line path in the plane parallel to input array, the strand 21' would become physically entangled with other strands of subbraid i. Entanglement prevents subsequent reconfiguration through the knotted region and leads to imminent failure of the switching system.

A proper path 111 of the strand endpoint 22 is represented by the dotted line in FIG. 4A, wherein the strand passes below those strands originating from a higher level at the switch backbone and above those strands originating from a lower level at the switch backbone.

Since the strands within any column have a non-repeating braid structure, they occupy their own layer 175, which can be individually peeled back from the other layers. FIGS. 4B and 4C illustrate topologically equivalent end-on views of strands within the zone i. In this representation, the circuit j passes between these separate layers corresponding to strands "8" and "10". The subbraid essentially separates into two partial subbraids with a gap formed therebetween. Consequently, path 111 does not cross nor entangle adjacent strands.

Placement of circuits within each subbraid column requires consistent application of ordering conventions. FIGS. 4B and 4C illustrate two alternative implementations of the ordering rule, corresponding to positive and negative braids, respectively. These figures are non-physical and provide a topological view of a particular zone 101-i by revealing the ordering of layered circuits 21 therein. A positive braid ordering rule requires that fiber circuits 21 be placed from left to right within each zone 101 with increasing addresses (or elevations) at the one dimensional backbone. The addresses are in general non-sequential and in this particular example for illustration purposes, are labeled "1", "2", "3", "6", "8", "10", "13", and "14". A negative braid ordering rule requires that fiber circuits 21 be placed from left to right within each zone 101 with decreasing addresses (or elevations) at the one dimensional backbone. Note that the trajectories to reconfigure circuits for these two conventions are different. Non-entangling algorithms can be developed regardless of the sign of the braid, as long as it is either positive or negative non-repeating.

FIG. 5A illustrates an example terminal-map 110 and reconfiguration trajectory to move the proximal end 22 of a strand 21 from a terminal A to a terminal B within the array of input terminals 170, in which the interconnections are ordered according to a positive braid. This terminal map 110 depicts a 10-column by 14-row array of terminals, wherein the numbers associated with each terminal correspond to the address of the particular circuit 21 attached thereto. Each fiber circuit 21 within the column originates from a different level of backbone 41 and is associated with an address used to determine the proper non-blocking trajectory for the circuit. In these examples, for illustration purposes, each terminal has been assigned a fiber circuit with a random address.

In a further example of the reconfiguration method, a first fiber circuit at input terminal A (col, row)=(1, 6) is to be switched to port B (10, 4). A second circuit presently at port B is moved to a docking port (not shown) to vacate port B. As shown in FIG. 5A for a positive braid and FIG. 5B for a negative braid, as the first circuit moves from left to right across this array of ports, it passes through intervening columns or subbraids 101-1, ... in a sequential fashion, without entangling any potentially crisscrossing circuits within the columns.

To trace out a non-interfering path through the array of fiber circuits, the particular circuit A follows a path crossing above or below the columns of connectors and their attached fibers, wherein fiber circuit A passes below those optical circuit elements which originate from higher levels at the backbone and pass above those elements which originate from lower levels of the backbone. The paths represented by FIGS. 5A and 5B represent the relative positions of the various circuits and are not to scale, nor are they representative of the true physical path. The actual trajectory is dependent on the chosen actuation approach.

Consistent ordering rules enable the multiplicity of strands to maintain a coherent, ordered state reconfigurable for an unlimited number of times, without compromising coherence and the non-repeating braid structure. Order is reflected in the assignment of a consistent positive or negative braid ordering convention to each successive column of the input terminal array. We disclose below particular advantages desired in accordance with this invention by alternating the braid ordering sign of adjacent columns. However, basic understanding of the methodology of columnar movement and selective reel shuffling or shifting as previously described is first desirable.

FIG. 5A and FIG. 5B present reconfiguration paths consistent with the rules delineated in the previously filed parent applications as to the braid orientation of each column. The positive direction is defined as the direction of increasing column number (x direction in figures). Shuffling of a particular braid or column consists of the lateral shifting of each row 71 by half the intercolumn spacing in the direction of increasing column number, wherein the direction of shuffling for that particular braid or column depends on the one-dimensional backbone 41 address of the strand 21 undergoing reconfiguration and the backbone addresses of each strand within the particular braid or column 101.

In a positive shuffle, a row shifts to increasing column direction if the particular strand within that row of the particular column has a backbone address greater than the backbone address of the strand undergoing reconfiguration. A row shifts to decreasing column direction if the particular strand within that row of the same particular column has a backbone address less than the backbone address of the strand undergoing reconfiguration. This programmed shuffling produces a weaving pattern or bipolar shuffle pattern with a positive sign.

In a negative shuffle, a row shifts to decreasing column direction if the particular strand within that row of the particular column has a backbone address greater than the backbone address of the strand undergoing reconfiguration. A row shifts to increasing column direction if the particular strand within that row of the same particular column has a backbone address less than the backbone address of the strand undergoing reconfiguration. This programmed shuffling produces a weaving pattern or bipolar shuffle pattern with a negative sign.

In a first example, from FIG. 5A, when the strand undergoing reconfiguration crosses a positive braid in the positive direction, the positive braid must undergo a positive shuffle and the strand undergoing reconfiguration must weave down the braid.

In a second example, from FIG. 5A, when the strand undergoing reconfiguration crosses a positive braid in the negative direction, the positive braid must undergo a positive shuffle and the strand undergoing reconfiguration must weave up the braid.

In a third example, from FIG. 5B, when the strand undergoing reconfiguration crosses a negative braid in the negative direction, the negative braid must undergo a negative shuffle and the strand undergoing reconfiguration must weave down the braid.

In a fourth example, from FIG. 5B, when the strand undergoing reconfiguration crosses a negative braid in the positive direction, the negative braid must undergo a negative shuffle and the strand undergoing reconfiguration must weave up the braid.

In a fifth example, when the strand undergoing reconfiguration changes row position while remaining within the same positive braid, the positive braid must undergo a positive shuffle and the strand undergoing reconfiguration may weave up or down the braid.

In a sixth example, when the strand undergoing reconfiguration changes row position while remaining within the same negative braid, the negative braid must undergo a negative shuffle and the strand undergoing reconfiguration may weave up or down the braid.

In accordance with the applicant's invention as previously disclosed in the referenced parent applications, a programmable cross-connect comprises a multiplicity of rows 71 of input terminals in dynamic alignment to one another. Independent actuation and translation of entire connector rows 71 along the x direction is provided by a programmable shuffling mechanism 64. The paths shown in FIG. 5 are implemented by both gripper 50 motion and transverse actuation of each connector row 71. The gripper 50 translates up and down columns in a straight-line path, with the rows 71 shuffling transversely according to the shuffle pattern to ensure that the particular fiber circuit 21 moves to the left or right of other circuits within the column. In this example, the circuit moves according to a sequence of steps comprised of alternately descending into and ascending out of the intercolumn gaps 118. The circuit must fully clear the first subbraid 101-1 before entering and weaving through the second subbraid 101-2.

In reference to FIG. 5, there is equivalence between moving above or below a circuit and moving to the left or right of the same circuit. The arrows in column three of FIG. 5 indicate the directions the rows must shuffle as the circuit A passes through and across this particular column. The movable endpoint of a circuit 21' is constrained to lie within a region substantially parallel to and in the vicinity of the plane of input terminal array 170. Within this region there exist open columnar zones where the gripper 50 can operate without interfering or snaring surrounding fiber circuits.

Braid Reconfiguration Optimization for Speed and Efficiency

In accordance with the presently disclosed configuration, however, significant advantages are gained by varying the sign of each subbraid comprising the interconnect system such that it alternates for adjacent subbraids. Once again considering the analogy between the strands comprising a braid and the "pages" comprising a "book", in this unique configuration each subbraid is an independent "chapter", and the "pages" of even numbered "chapters" have an ascending (positive) order and the "pages" of odd numbered "chapters" have a descending (negative) order.

Figure 6:
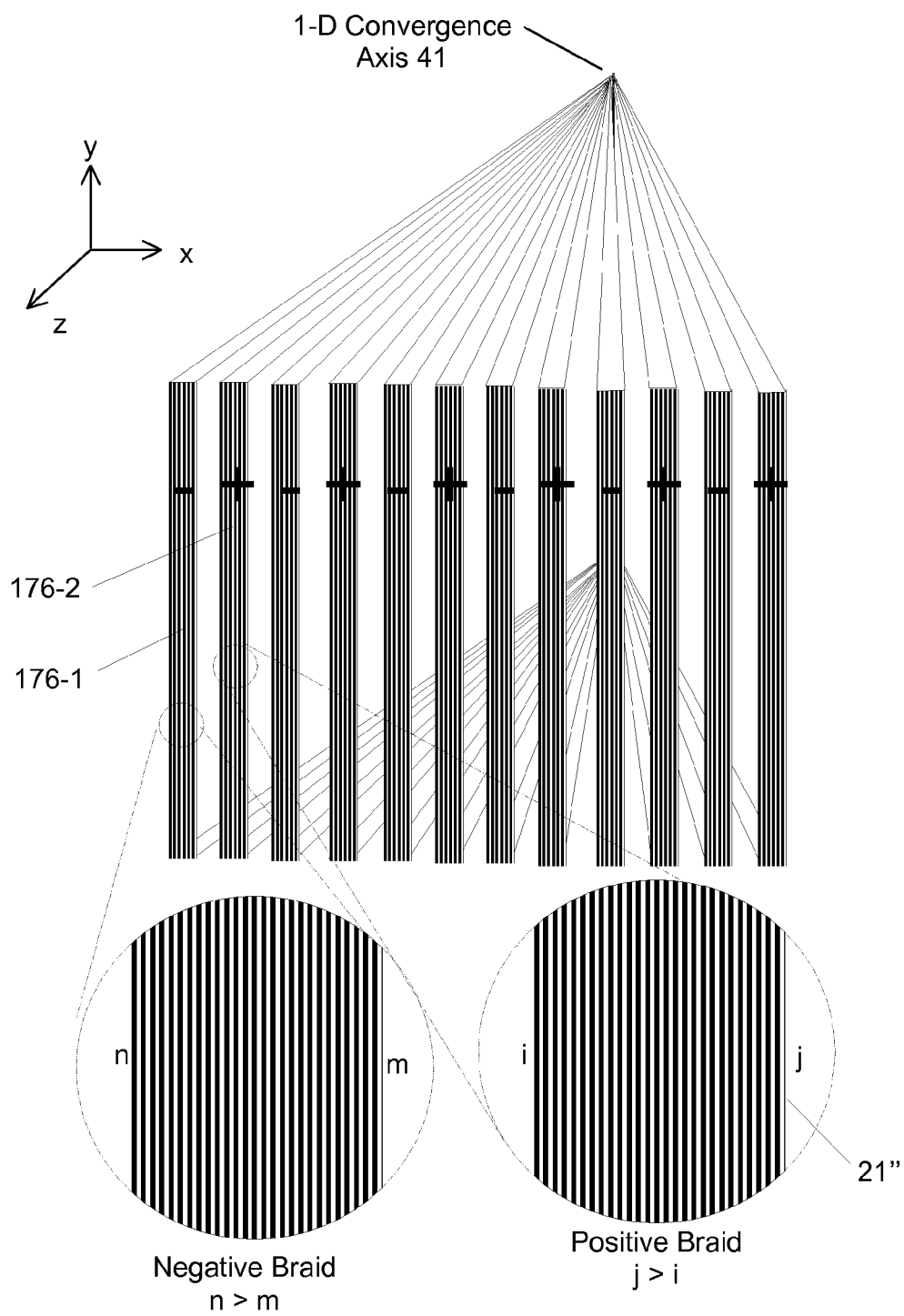
FIG. 6 illustrates an example of a multiplicity of independent interconnection braids comprising the switching system, with adjacent braids being opposite in sign to one another.
Figure 7:
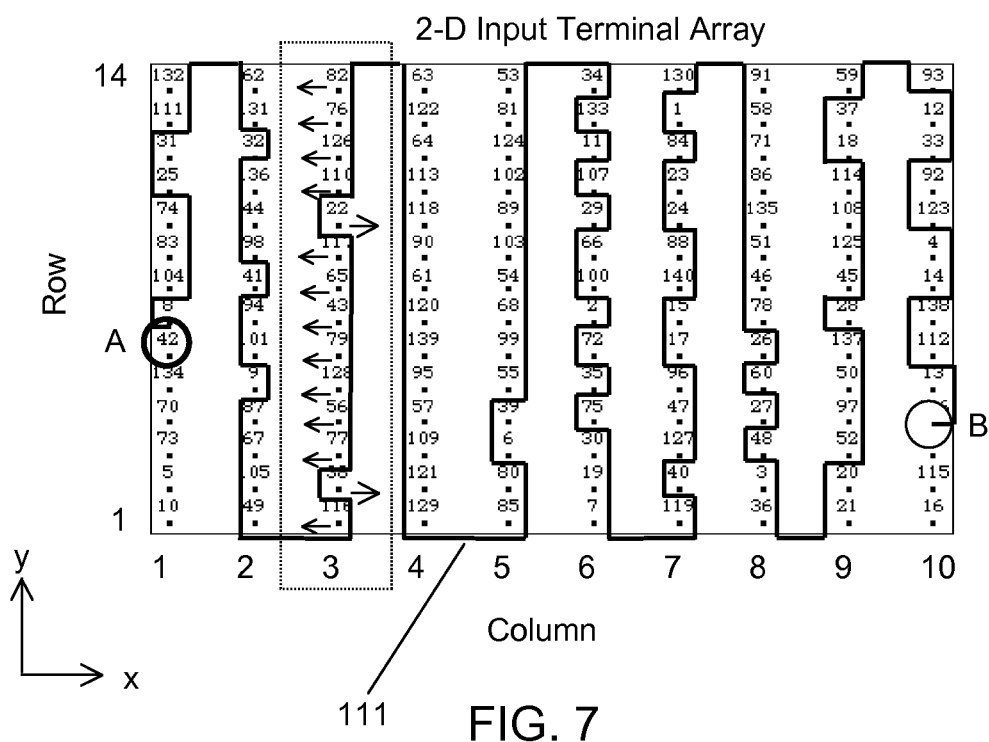
FIG. 7 illustrates an example of a reconfiguration trajectory of the strand proximal end to move an interconnect from port A to port B for a system with adjacent subbraids having alternating signs.

Referring now to FIG. 6, which schematically depicts the topological distribution of negative braids 176-1 and positive braids 176-2, and FIG. 7, the sequential trajectory of a strand is illustrated as it is repositioned from an initial address A to a target address B with this alternating sign topology. FIG. 6 schematically represents this alternating-sign braid topology, with magnified views of the individual ordered layers comprising the adjacent positive and negative braids. This configuration offers the advantage of most efficient and rapid reconfiguration, the result of it minimizing the cumulative travel distance of the gripper during the reconfiguration process. In FIG. 7, the first column 1 (to the left) is a negative braid, and the sign of the columns alternate thereafter. In comparison to FIG. 5A (all positive braids) and FIG. 5B (all negative braids), the length of the equivalent reconfiguration path and the reconfiguration time is reduced by about a factor of two by alternating the sign of adjacent braids.

In these examples, the distinction between positive and negative ordering is based on an arbitrary definition of the positive direction. For a different definition, the conventions for positive and negative ordering would simply be reversed. Stated in another way, the alternation of the signs of adjacent braids can start in either direction.

These ordering conventions automatically reconfigure fiber circuits within a coherently ordered, yet arbitrary, arrangement of intermixed fibers. These algorithms require a knowledge of the positions of all circuits within the interconnect volume at both the input plane 91 and intermediate plane 93 (FIG. 2A). Based on this knowledge and the application of ordering rules, any circuit can be arbitrarily reconfigured any number of times.

In a particular example of the invention, the movable endpoint of circuit 21' is translated by a sequence of steps illustrated in FIGS. 8 through 11. These figures graphically represent sub-reconfiguration processes moving to the left and right in the input array, for positive and negative braids. The dashed lines represent the path of the fiber endpoint undergoing reconfiguration, and the solid lines represent the path of the gripper. The reconfiguration trajectory is in general composed of any of these twelve sub-processes. Sequence A represents the initial removal of a circuit from its originating terminal, sequence B represents a circuit crossing an intermediate column, and sequence C represents the final insertion of a circuit into its destination terminal.

For certain reconfiguration situations, the reconfiguration time may be reduced for instances where the backbone addresses of two or more adjacent columns are all above or below the backbone address of the circuit undergoing reconfiguration. The gripper may carry the circuit over columns in which the backbone addresses of the entire column lie below that of the circuit undergoing reconfiguration. Alternatively, the gripper may disengage the circuit from the docking port, allow the docking port to shift to the left or right, reengage the circuit into the docking port, and finally move the docking port to shift to the right or left, respectively. The specific sequences are presented in detail next.

Positive Move, Positive Braid Rules

Figure 8:
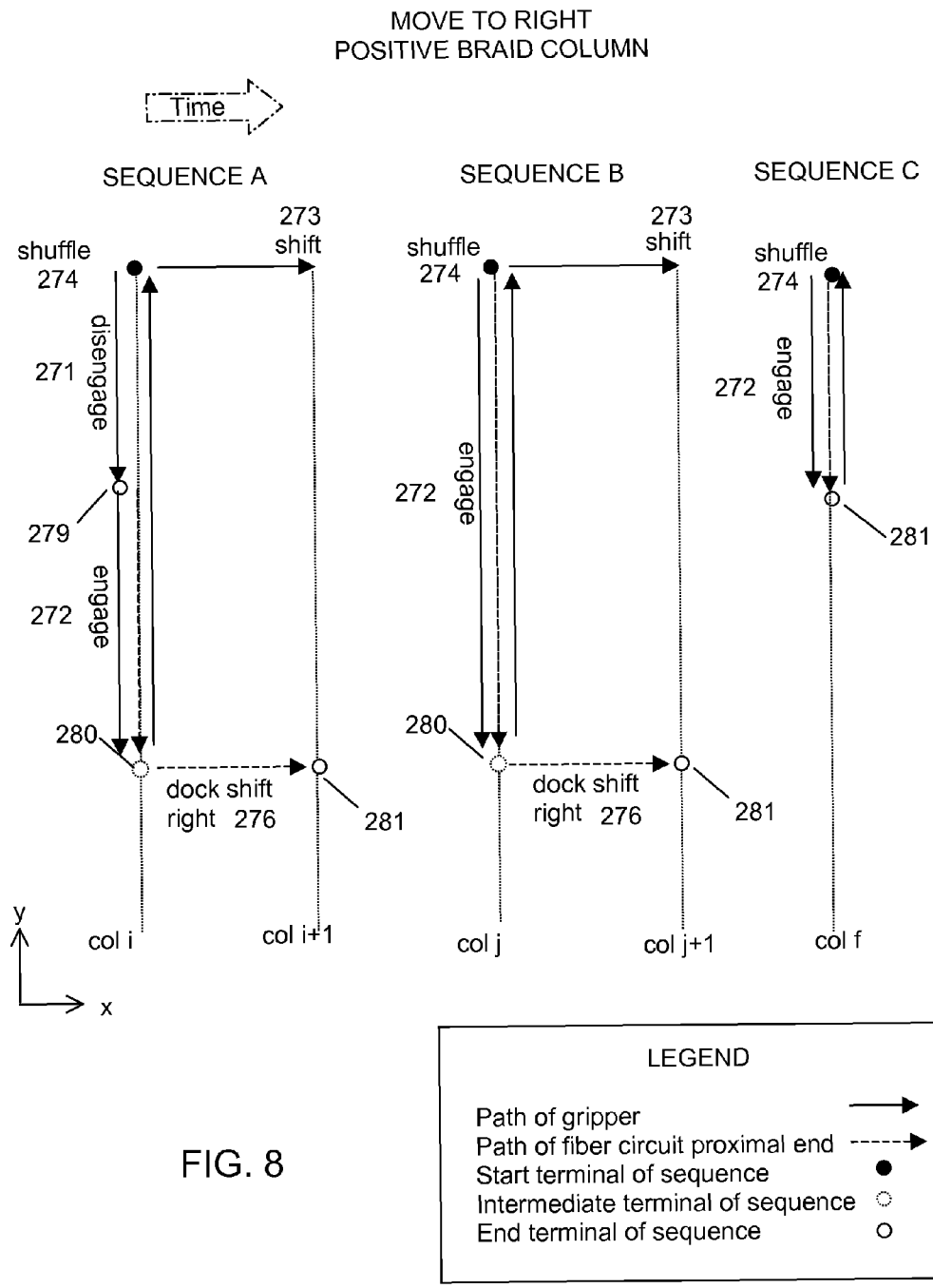
FIG. 8 is a diagram of the motion sequence to move the proximal end of fiber strand to increasing column number (moving right) for a positively braided column.

FIG. 8 illustrates reconfiguration sequences for a move to the right (positive move) at positive braid columns. FIG. 8, sequence A corresponds to the removal of a circuit from its originating terminal 279, followed by a move to the right at a positive braid. This sequence begins with a shuffle step 274 of the rows of the column in directions based on the numbered addresses of fibers 21' at the convergence axis 41. The gripper descends into the columnar gap formed during the shuffling process, physically splitting the subbraid into two partial subbraids, and disengages (step 271) the starting connector from a front panel receptacle. The connector attached to this circuit is disengaged from its initial port 279. The gripper then moves to the bottom of this column through the split subbraid to engage the connector into a bottom docking port 280. After engaging the circuit into the docking port, the gripper returns to the top of the column. The docking port moves to the right, carrying the circuit 21' therewith. The gripper then shifts (step 273) by a column spacing to the right to begin the next move, which, in the preferred example of the alternating sign braid configuration, would correspond to a negatively braided column.

FIG. 8, sequence B corresponds to the crossing to the right through an intermediate positive braid. The sequence begins with row shuffling (step 274) determined by a calculation based on the address of the circuit undergoing reconfiguration and the addresses of all circuits within the intermediate braid to generate the shuffle pattern or bipolar shuffle code. The gripper descends down the column, carrying the circuit, and engages the circuit at the bottom most docking port 280. The gripper then returns to the top of this column and the gripper shifts (in step 273) to the right by a column spacing to the top of the adjacent column. The docking port also shifts (step 276) by a column spacing to the right, carrying the circuit under and across the braid to new position 281.

FIG. 8, sequence C illustrates the insertion of the circuit into its destination column, for a move to the right at a positive braid. The rows shuffle (step 274) and the gripper carries the circuit down the center of the column and engages (step 272) the circuit in the destination port 281.

Positive Move, Negative Braid Rules

Figure 9:
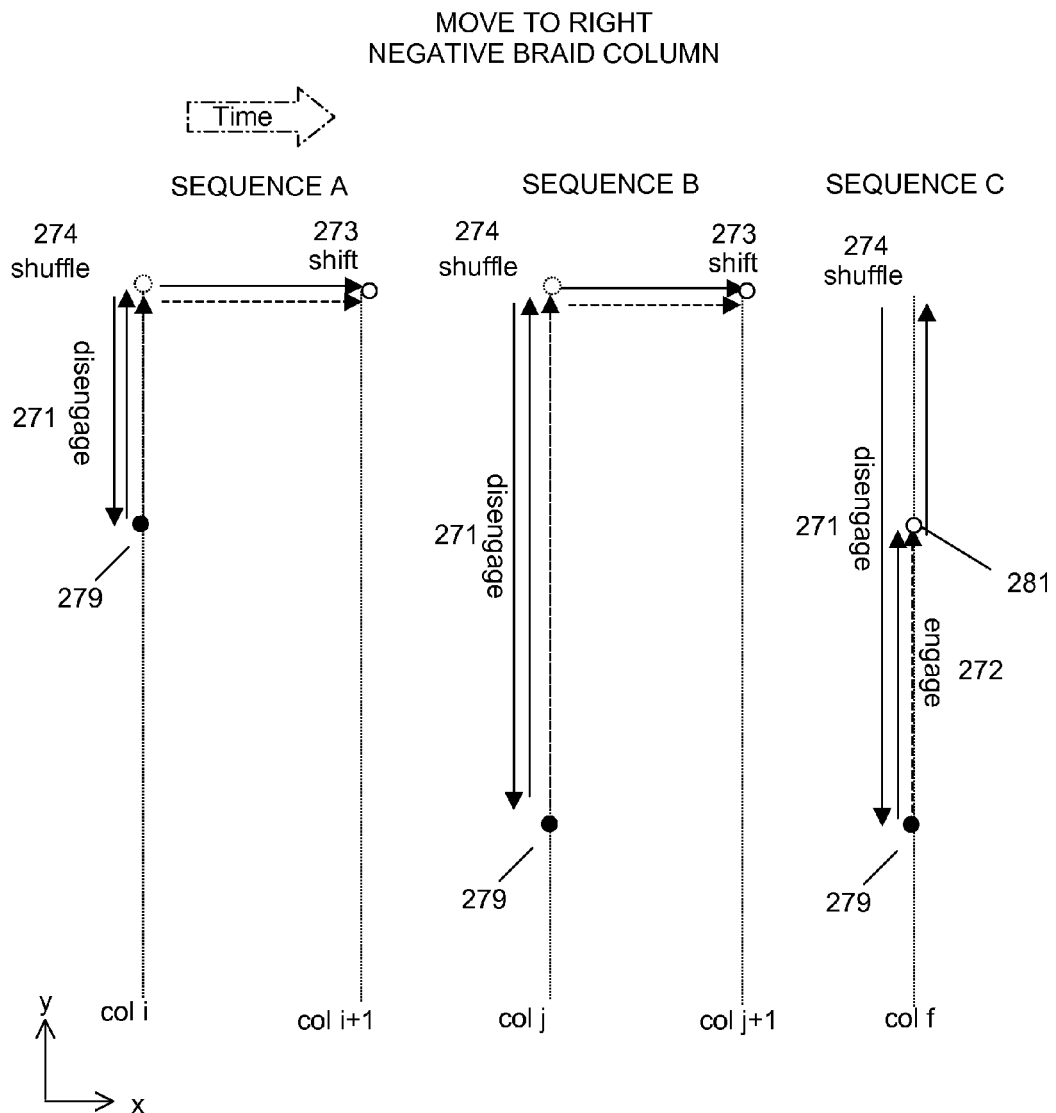
FIG. 9 is a diagram of the motion sequence to move the proximal end of fiber strand to increasing column number (moving right) for a negatively braided column.

FIG. 9 illustrates the sequences for a move to the right (positive move) at a negatively braided column. FIG. 9, sequence A corresponds to the removal of a circuit from its originating terminal 279, followed by a move to the right at a negative braid column. Sequence A begins with a shuffle (step 274) of the rows of the column in directions based on the numbered addresses of fibers 21' at the convergence axis 41 to provide a bipolar shuffle pattern, that is, one moving by a fixed increment in one of two opposite directions. The gripper descends into the columnar zone opened during the shuffling process, physically splitting the subbraid into two, and disengages the starting connector from its front panel receptacle 279. The connector attached to this circuit is disengaged at step 271 from the initial port 279. The gripper then returns to the top of this column through the split subbraid. The gripper shifts laterally in step 273 by a column spacing to the right to begin the next move, which, due to the alternating sign braid configuration, would correspond to a positively braided column.

FIG. 9, sequence B corresponds to the crossing to the right through an intermediate negative braid. The sequence begins with a row shuffle (step 274) determined by a calculation based on the address of the circuit undergoing reconfiguration and the addresses of all circuits within the intermediate braid, which is used to determine the braid code or pattern of equidistance shifts. The gripper descends down the column and disengages at step 271 the circuit from the bottom most docking port 279. The gripper then returns to the top of this column carrying the circuit, and the gripper then shifts (step 273) to the right by a column spacing to the top of the adjacent column.

FIG. 9, sequence C illustrates the insertion of the circuit into its destination column, for a move to the right at a negative braid. The rows shuffle (step 274) and the gripper descends down the center of the column to disengage (step 271) the circuit from the docking port 279. The gripper carries the circuit upward until it reaches the destination row, and inserts (step 272) the circuit into the destination port 281.

Negative Move, Positive Braid Rules

Figure 10:
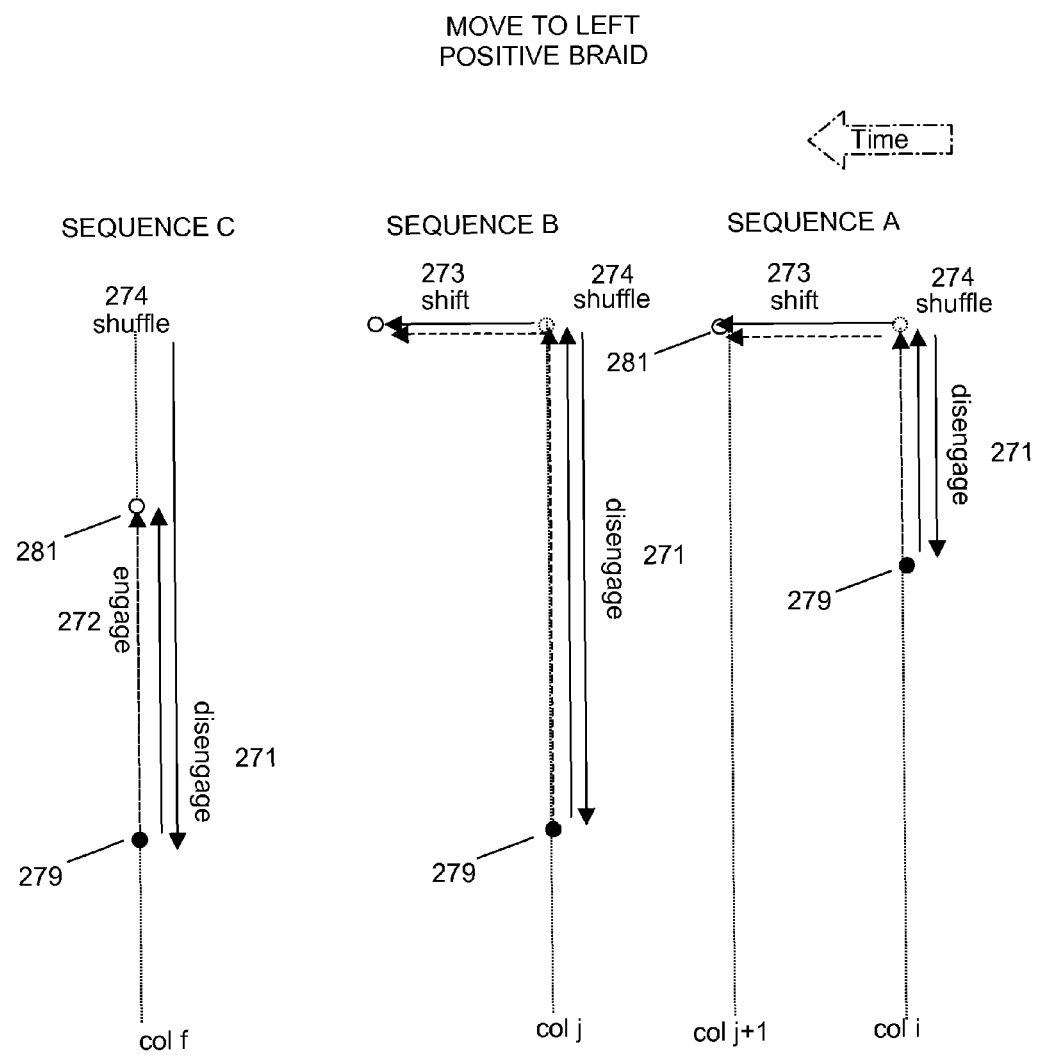
FIG. 10 is a diagram of the motion sequence to move the proximal end of fiber strand to decreasing column number (moving left) for a positively braided column.

FIG. 10 illustrates the reconfiguration sequences for a move to the left (negative move) at columns ordered as a positive braid. FIG. 10, sequence A corresponds to the shuffle (step 274) of rows, the disengagement (step 271) of a circuit from its originating terminal 279, followed by a shift (step 273) to the left at a positive braid. Sequence A begins with the shuffling of rows of the column in directions based on the numbered addresses of fibers 21' at the convergence axis 41. The gripper descends into the columnar zone opened during the shuffling process, effectively splitting the subbraid into two. The connector attached to this circuit is disengaged (step 271) from its initial port 279. The gripper then moves to the top of this column through the split subbraid. The gripper shifts (step 273) by a column spacing to the left, which, due to the alternating sign braid configuration, would correspond to a negatively braided column.

FIG. 10, sequence B corresponds to the crossing to the left through an intermediate positive braid. The sequence begins with row shuffling (step 274) determined by a calculation based on the address of the circuit undergoing reconfiguration and the addresses of all circuits within the intermediate braid. The gripper descends down the column and disengages (step 271) the circuit from the bottom most docking port 279. The gripper then returns to the top of this column with the circuit and the gripper shifts (step 273) to the left by a column spacing to the top of the adjacent column.

FIG. 10, sequence C illustrates the insertion of the circuit into its destination column, for a move to the left at a positive braid. The docking port with the circuit shifts to the left, the rows shuffle (step 274) and the gripper descends down the center of the column to disengage (step 271) the circuit from the docking port 279. The gripper rises to the destination row and engages (step 272) the circuit into the destination port 281.

Negative Move, Negative Braid Rules

Figure 11:
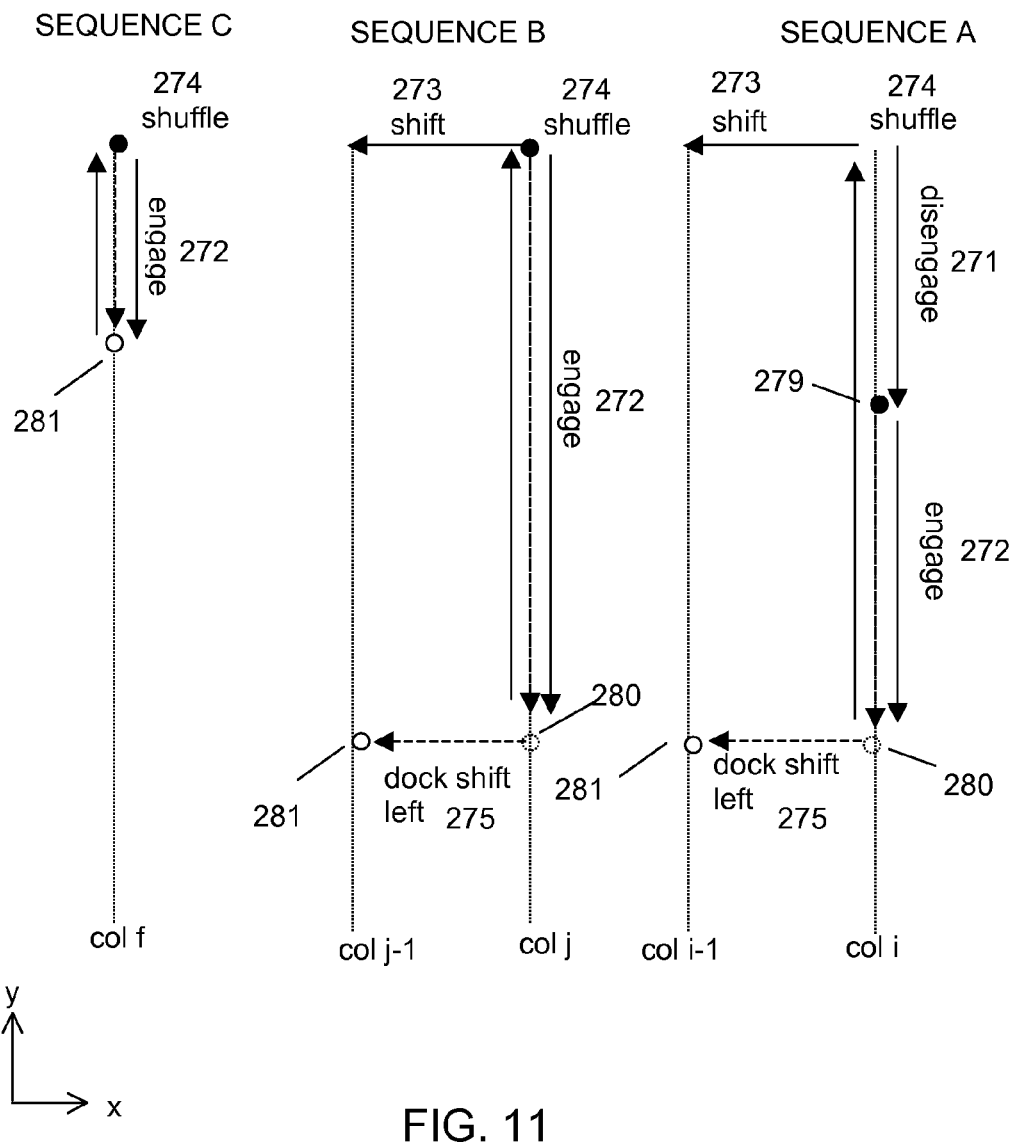
FIG. 11 is a diagram of the motion sequence to move the proximal end of fiber strand to decreasing column number (moving left) for a negatively braided column.

FIG. 11 illustrates reconfiguration sequences for a move to the left at a negative braid column. FIG. 11, sequence A corresponds to the removal of a circuit from its originating terminal, followed by a move to the left at a negative braid column. Sequence A begins with shuffling (step 274) the rows of the column in directions based on the numbered addresses of fibers 21' at the convergence axis 41. The gripper descends into the columnar zone opened during the shuffling process, effectively splitting the subbraid into two, and disengages (step 271) the starting connector from its originating port 279. The gripper carries the circuit down to the docking port, and engages (step 272) the connector into the docking port 280. The gripper returns to the top of the column through the split subbraid. The gripper then shifts (step 273) by a column spacing to the left to begin the next move, which, due to the alternating sign braid configuration, corresponds to a positively braided column. The docking port shifts (step 275) to the left to carry the circuit to the bottom of the adjacent column.

FIG. 11, sequence B corresponds to the crossing to the left through an intermediate negative braid. The sequence begins with row shuffling (step 274) determined by a calculation based on the address of the circuit undergoing reconfiguration and the addresses of all circuits within the intermediate braid. The gripper carries the circuit down the column and engages (step 272) the circuit into the bottom most docking port 280. The gripper then returns to the top of this column, and the gripper then shifts (step 273) to the left by a column spacing to the top of the adjacent column. The docking port shifts (step 275) to the left, carrying the circuit to the bottom of the adjacent column 281.

FIG. 11, sequence C illustrates the insertion of the circuit into its destination column, for a move to the left at a negative braid. The rows shuffle (step 274) and the gripper descends down the center of the column to engage (step 272) the circuit into the destination port 281.

Reel Tensioning

Systems in accordance with the invention are intended to provide capacity for many thousands of optical fibers, each of which must be free of excessive stressing as well as excessive bending when manipulated. Controllable tension of variable length optical fibers is uniquely provided by reels in accordance with the applicant's previously issued U.S. Pat. No. 7,315,681 entitled "Fiber Optic Rotary Coupling and Devices". That teaching of reels for tensioned feeding and retraction of optical fiber elements is generally applicable herein, but even though it is a compact combination of low elevation, the present system imposes spatial demands which make it highly desirable that the reel devices and their geometry be substantially further compressed. This is accomplished in accordance with the invention by the modular construction of FIGS. 16A and 16B, which incorporates reel assemblies of very low height and by reel configurations as depicted in FIGS. 18A-18D.

The modular construction is shown in FIGS. 16A and 16B and comprises a number (four) of stacked take-up reels 42, each in a separate partial housing of low height (0.4 inches or less), and each, in this example, comprising one reel 42 in a four high stack of reels distributed in a 4×3 planar configuration, as shown in FIG. 16B. The optical fibers extending from each of the individual reels 42 feed into a fiber backbone 41 as described above and in the previously referenced parent applications and from there are distributed outwardly into an open interconnect volume 108 leading to individual connector terminals 110. Each module includes a rigid printed circuit board substrate 84 on which forty-eight take-up reels 42 reside, each feeding their fiber 21 a different connector terminal 110, the terminals 110 being accessible from the exterior. Fibers 21 are individually routed from reels 42 through a series of low friction fiber guides 92 that suspend the fibers passing therethrough and direct them potentially through 90 degree bends, while presenting negligible friction to the fibers sliding within. The fiber guides 92 are positioned across the printed circuit board substrate 84 to route all moving input fibers to the central fiber backbone location 41. As described below in connection with FIG. 21, the connector terminals 110 connect outwardly to exterior optical fibers in the system harness. Within the open interconnect volume 108, the gripper mechanism heretofore described can penetrate through the three-dimensional matrix of strands to seize a particular optical fiber at a chosen address, remove it and interweave it through the columns and rows, in accordance with the invention. As depicted in FIGS. 16A and 16B, this compact module is of less than 1.6 inches height, so that a significant number of modules can be added as needed and stacked within the equipment rack.

Automatic Fault Recovery

Figure 20:
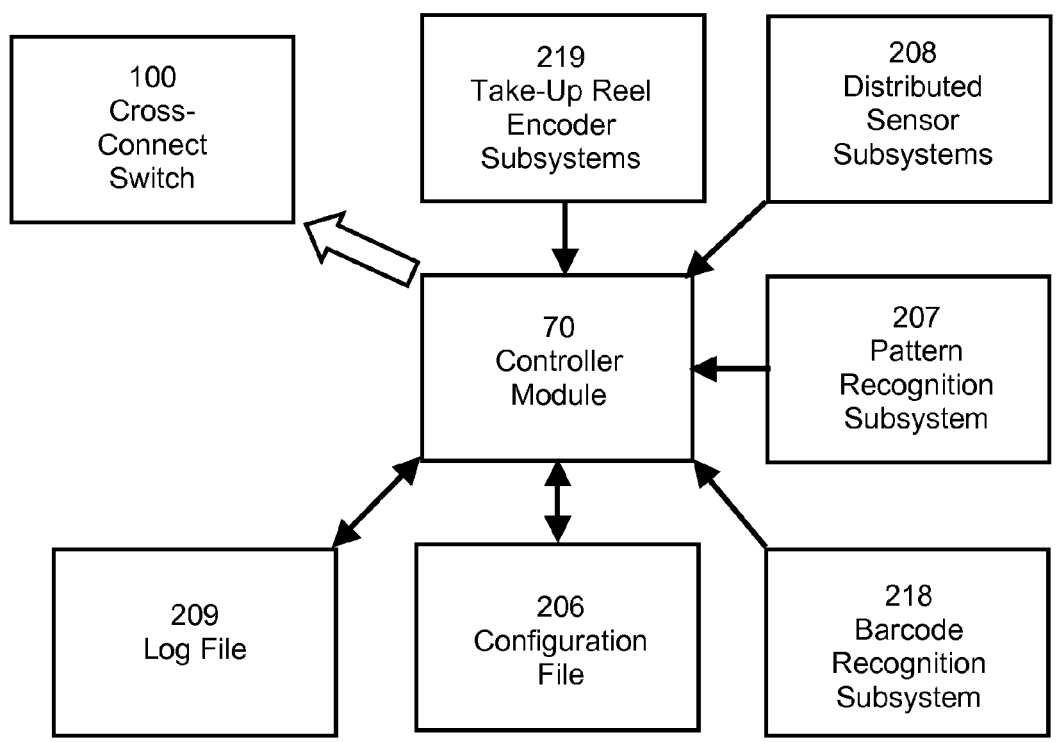
FIG. 20 is a block diagram of the architecture of a subsystem providing the capability to self-restore the cross-connect's operational state.

Methods and systems to achieve intelligent and automated fault recovery are also disclosed herein, as shown generally in FIG. 20. Data and procedures used in the execution of a deterministic, multi-state port reconfiguration process is recorded in real-time during the process to provide a detailed log file 209 record of the steps being effected. Should a power failure or other fault or failure occur to interrupt the reconfiguration process, the saved log file is restored to reveal the exact point in the reconfiguration process where the fault occurred. For robustness, the log file is typically saved to a mirrored or redundant memory device at the same time.

In a particular example of the fault recovery process, the reconfiguration is restarted in a simulation mode following interruption. That is, the controller steps through the reconfiguration process without executing the actual processes, such as actuation of the gripper. The saved log file is compared to the simulation log file line-by-line during process simulation, which should match on a line-by-line basis until the point of failure. Once the simulation process reaches the final entry in the saved log file, the process has returned to the point at which it had halted. At this point, the process exits the simulation mode and proceeds with the execution of the actual process.

The recording of all steps within the reconfiguration process is augmented by a variety of recorded sensing signals, derived from a distributed sensor subsystem 208, including rotary encoders and photosensors, for example, a camera-based pattern recognition subsystem 207, a camera-based barcode recognition subsystem 218, and a take-up reel encoder subsystem 219. The log file serves as the equivalent of an internal "black-box recorder" which records the state of the system and conditions leading up to a service interruption or failure. This feature enables the cross-connect system 100 to restore itself to a mode of proper operation even after an interruption in the reconfiguration process due to an earthquake or power outage, for example. This restoration process is desirable because the stability of reconfiguration algorithms and the preservation of coherent ordering depend critically not only on the initial and final states, but also on the exact strand trajectory followed during intermediate states.

The monitoring of proper tensioning of fiber strands 21 is provided by digital electronic means. Excess strand 21 lengths are retained on slack fiber take-up spools 43 (FIGS. 18A-18D) that induce a slight tension in strand 21 and are sufficiently radiused to cause little or no optical insertion loss due to fiber bending. A configuration for feeding out and retracting optical fiber strands without excessive stress or bending has been disclosed by the inventor in U.S. Pat. No. 7,315,681. To ensure that slack fiber is properly collected to maintain straight-line interconnections during reconfiguration, the take-up reels as shown are angularly biased in a more central fashion and include a molded, circular, notched encoder wheel 45 that periodically interrupts the light path of a photointerruptor circuit 46. With each rotation of the reel 43 within base 44, the notched wheel interrupts the light beam and the photointerruptor produces a series of electronic pulses that are received and converted into a corresponding electrical (e.g., TTL) pulse train. An electronic counter circuit counts these pulses and reports the total count back to the primary processor. The count is compared to an estimate based on geometrical calculations of the change in path length while moving across each column. The difference between the measured and calculated counts must be less than a predetermined error value for proper operation.

Reliability of flexible fiber circuits is improved by sleeving the coated optical fiber 24 with a semi-rigid, low friction PEEK plastic loose tube 49 (FIG. 19A). PEEK tubing with 0.030 to 0.040 inch outer diameter and 0.015 to 0.025 inch inner diameter is optimal to provide effective strain relief and the low friction characteristics to enable the movement of tensioned flexible circuits during the dynamic reconfiguration process. The spring tensioning force for the take-up reel is provided by a spring tempered steel wire 52 of 0.016 to 0.032 inch diameter that is longitudinally adjacent the optical fiber 24. Unique electronic identification of the strand can be achieved through a tracer wire 51, which is optional. The spring and optical fiber are maintained in parallel alignment within a flat, thin-walled plastic sleeve 48 or dual lumen tube 53 and forming a coiled element 67. The material for the tube is typically a low friction material such as PEBAX, PTFE, PFE). The typical sleeve wall thickness is 0.0015 to 0.015 inch. The fiber-spring coiled element 67 is about 30 to 150 inches long and winds and/or unwinds as the reel 43 rotates. The spring wire 52 causes the reel to automatically wind any excess fiber lengths.

In the specific examples illustrated in FIGS. 19B and 19C, the loose tube and thin-walled sleeve are replaced by a dual lumen tube 53, fabricated of nylon, PEBAX or PVC, for example. This tube retains the spring 52 and fiber 24 in longitudinal alignment. The outer surface of the dual lumen tube can neck down at the mid-section (FIG. 19B) or have flat outer surfaces (FIG. 19C). The tubing may be coated with an additional material (i.e., PTFE) to reduce the coefficient of friction.

Cross-Connect Reconfiguration Speed

In some cross-connect switch implementations, the reconfiguration speed of the cross-connect switch is limited by the speed in which flexible fiber circuits are rewound onto the take-up spools. As the robotic gripper 50 passes alongside each subbraid, the suspended length of fiber within the interconnection volume varies. The excess length is retained by the take-up spools 42. The rotation speed of the take-up spools is dependent on the torque provided by the fiber-spring coiled element 67, friction of the flexible fiber circuit and reel, and the mass of the reel and flexible fiber circuit. By reducing the mass and friction of the various elements, winding speed can be significantly reduced for high-speed operation. In general, there are limits to the tension of the fiber-spring coiled element 67, to prevent excessive forces on the optical fiber components.

In typical manual patch-panel systems, the locations of the input connector receptacles are arranged in rows 71, the rows remaining fixed in position during the lifetime of the panel. In contrast, the automated patch-panel system disclosed herein is comprised of a stacked arrangement of independently translatable rows 71 with input connector receptacles, and programmed row translation is coordinated with the motion of the internal robotic gripper 50. This configuration enables the gripper to travel at high velocity up and down columns 101, without the need to stop or change direction as it works its way up or down the column. Each row of connectors 71 includes a low friction, internal linear slide mechanism with precise positional references to ensure that all rows of the connector can be aligned horizontally (forming aligned vertical columns). For example, FIG. 13B illustrates a partial view of the translation mechanism, including actuation element 64 and position sensing circuit 39.

For some applications, the switch is provided with a number of input ports greater than the number of output ports. This enables excess input ports to be used as parking locations for unused fibers. An unused fiber is moved to the nearest open parking locations, as needed to quickly vacate a port. During a reconfiguration, an input port and output port or output fiber pair are specified. Typically the input port may be already occupied by an output fiber, so that this output fiber must first be moved to a parking location. The time to perform this step is minimized by providing a number of parking locations, wherein the parking locations are advantageously in the vicinity of the input port to minimize the distance that must be traveled to prepare the input port for a new fiber. For example, in a system with M columns of connectors, there may be one or more open ports per column, for >M empty ports. Typically, parking locations are provided alongside one or more rows of the docking module 215 as shown in FIG. 12B.

Elastic Cable Management to Accommodate Independent Row Translation

Prior art cable management techniques do not offer support for large numbers of fiber optical cables horizontally routed to automated cross-connects whose connector rows translate during reconfiguration. As a result, the high density of external fiber optic cables interfaced to the front connector array in accordance with the prior art arrangements susceptible to entanglement due to the sag of individual cables under the effects of gravity. While the introduction of rigid support structures would in principle support such cables, the rigid nature of prior art support structures limit access to front panel connectors and compromise the ability to reconfigure patchcords. As a consequence, there is a need for cabling interconnect techniques that facilitate the horizontal routing of significant numbers of fiber optic cables in a simple and inexpensive fashion while simultaneously preserving accessibility to cables and connectors while not impeding incremental lateral translation. Moreover, there is a need to effectively manage front-side patchcords on a row-by-row basis to facilitate automated lateral shuffling of connector terminal points within a fiber distribution rack, without introducing excessive stress on the fibers.

Figure 21:
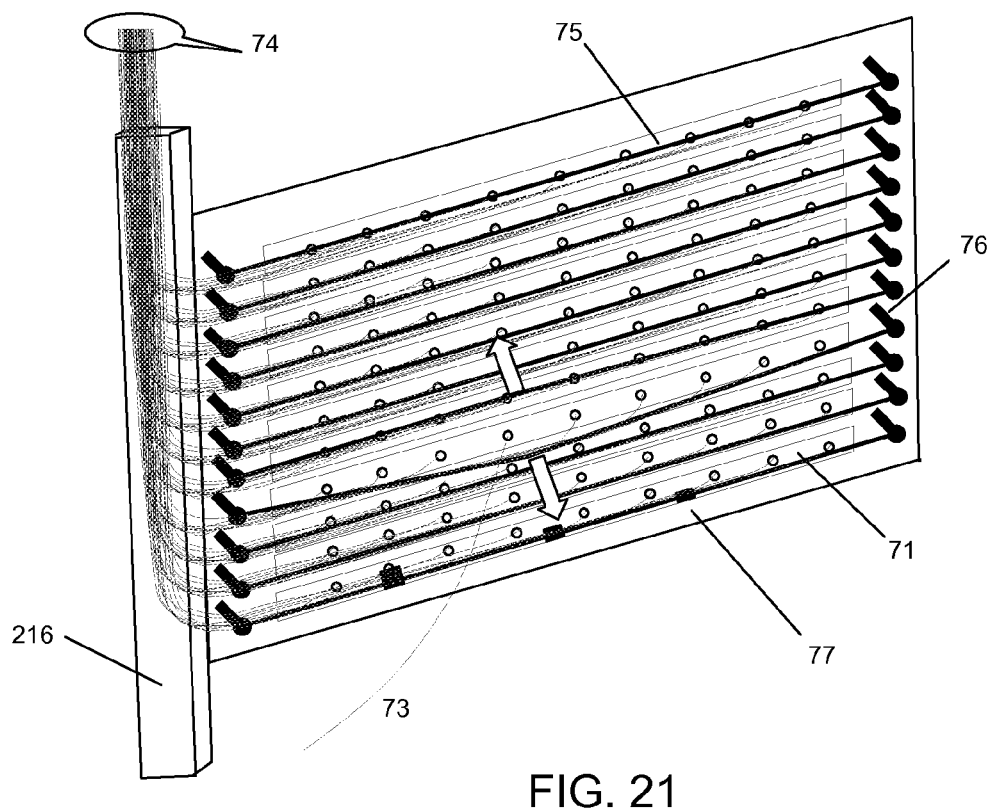
FIG. 21 illustrates an example of an array of shiftable input connectors, arranged in stacked rows on the wall of a housing, each row associated with a substantially parallel, flexible support suspended between fixed, rigid endpoints.
Figure 22:
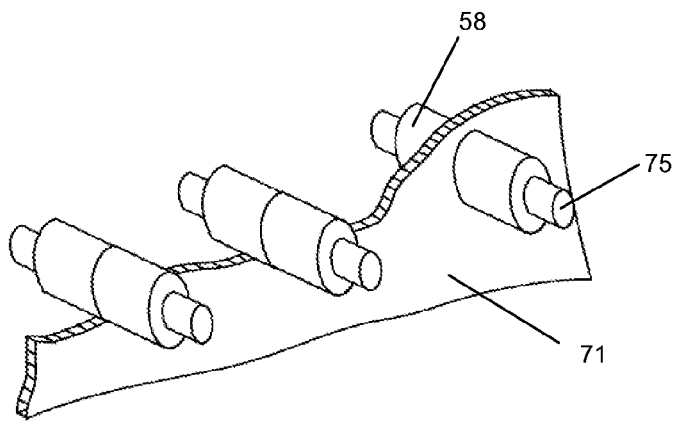
FIG. 22 is a fragmentary enlarged perspective view showing fiber optic interconnections to each end of separate shiftable terminals in the array of FIG. 21.
Figure 23:
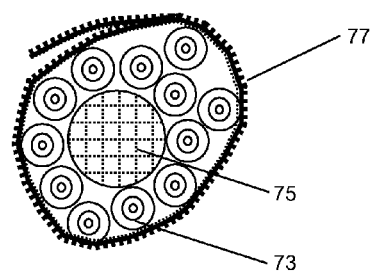
FIG. 23 illustrates a cross-section of a suspended, elastic cable management structure.
Figure 24:
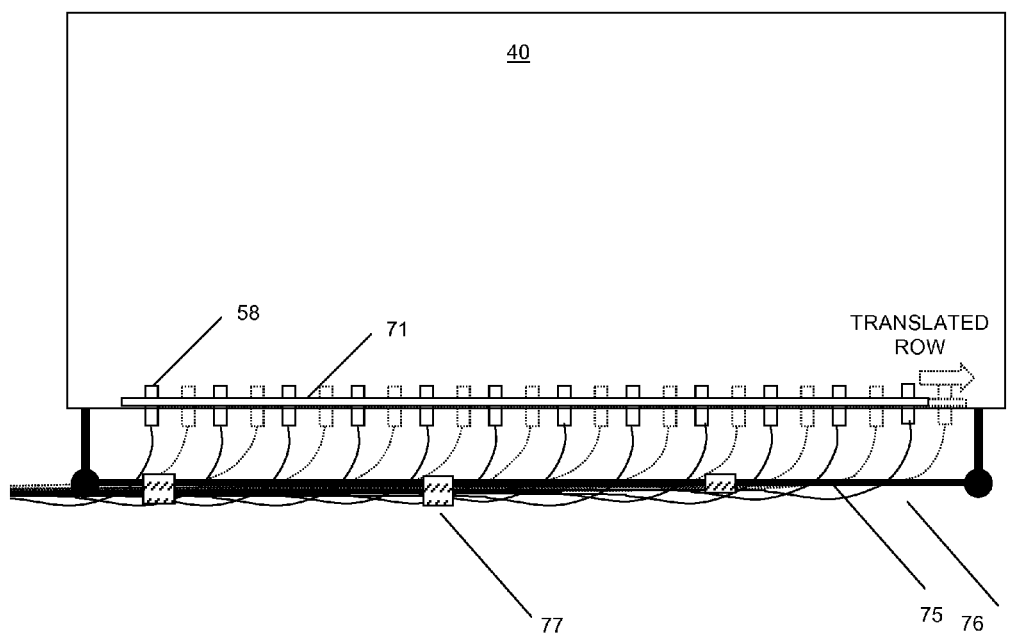
FIG. 24 illustrates in solid and dotted line representations, the change in configuration of a multiplicity of supported cables reconfiguring dynamically when connector receptacles shift parallel to elastic member.

In accordance with the invention, fiber optic cables attached to an external facing, horizontal row of connector terminals comprising part of an equipment frame are supported in parallelism to and at some distance from the row of terminals to a suspended, tensioned elastic support structure (FIGS. 21, 22 and 24). The elastic support structure 75 includes cords with substantially circular cross-section and fabricated of natural or synthetic elastomers exhibiting extensions of typically 20% or more. Furthermore, fiber optic cable-to-support attachment methods include a metal or molded plastic clip or hook-and-loop type of strap (e.g., Velcro™) 77 (FIG. 23), for instance. By suspending the cables 73 to these supports 75 via intermittent attachment points with substantial parallelism between the cables and the support as shown in FIG. 21, cables are routed to one or both edges of the frame.

In a particular embodiment of the invention, the elastic suspension member 75 is rubber cord covered with nylon, polypropylene or polyethylene fabric, or synthetic elastomer such as polyurethane. Typical cord materials can be extended by at least 100% under tension. Elastic cord may be in the form of a fabric covered latex rubber cord (i.e., "bungee cord"), covered with woven fabric to prevent abrasion to the core even when stretched. Such rubber cord typically stretches up to twice its length. Alternatively, the cord may include the class of elastomeric materials including EPDM rubber cord, which is weather resistant and will stretch up to three times its length, and polyurethane cord, which withstands oils, ozone and salt water, stretches to two times its length and has good "memory" that prevents it from permanently stretching. In accordance with this invention, typical elastic cord diameters are 0.25 inch or less, more commonly in the range of 0.062 to 0.187 inch.

By virtue of the low mass and low stiffness of the optical fiber cabling to be supported, small diameter cordage under tension is effective at vertically supporting and horizontally routing optical fiber to the edges of the equipment frame. The low transverse force produced by the tensioned cordage 75 ensures that a minimal shear stress is transferred to the optical fiber as the fiber cable 73 undergoes a 90-degree bend to achieve parallelism between fiber cable 73 and support cord. Also, the cables 73 extending from the connectors in each row 71 can shift incrementally, as shown by the dotted line position in FIG. 24. This shifting only locally straightens the cables 73 engaged in the opposite ends of the connectors in the row 71 that is incremented, and does not introduce significant drag or introduce meaningful stress on the fibers in the cables installed in each end of the connector in the row 71, as seen in the fragmentary view in FIG. 22 of a part of the row 71.

FIG. 23 illustrates in section a particular example of one of multiple flexible cable support cords 75 which are disposed in parallel with an equal number of fiber optic connector terminal rows 71 (FIG. 21) comprising the connector interface to a particular fiber optic device. More particularly, the fiber optic cables may be individually attached to suspended cords with small hook-and-loop straps 77, typically 1 inch wide and chosen to have a length adequate to encircle the bundle of cables and suspension support member. The cord diameter is about 0.1 inch and the cord-to-cord interval is 0.5 to 1.5 inches, corresponding to the spacing of connector rows at the fiber optic device. The cords are tensioned by fixed, rigid supports 76 (FIG. 21) at the cord 75 endpoints and in the vicinity of the edges of the equipment frame. To access any particular terminal in the array, adjacent cords can be easily separated as shown symbolically in FIG. 21 to displace cables in a non-invasive fashion and provide clearance for a technician's hand or tools to conveniently extract or insert a cable from or into the receptacle without affecting transmission in surrounding cables. For high-density interconnect systems, this enables a high fiber density to maximize space utilization without limiting physical access to individual cables.

FIG. 24 also illustrates the routing of pre-fixed fiber optic cables outwardly from a row 71 of terminals in the two-dimensional matrix to the left side of the connector panel. The fiber optic cables 73 generally must undergo a turn of up to 90 degrees to route along a path parallel to the row and extend to one or the other of the outermost edges of the equipment rack. Typically, the cables are attached to the support cord such that the quarter turn includes a small excess cable length (typically 0.5 to 1.5 inches) to ensure minimal shear forces. At the edge(s) of the equipment rack, vertical cable management "ladders" 74, potentially including slack cable spools, are used to manage the cables.

In FIG. 24, the position of the movable connector terminals that have shifted to the right relative to the fixed endpoints of the cable suspension system are shown in dotted line renditions. This situation, in which terminal rows undergo programmed and repeated shuffling motion, is typical for automated patch-panel systems. The elastic support 75 (FIG. 23) is able to flexibly reorient, enabling the fiber optic cable to follow a new low-loss, graceful bend as the cable receptacles dynamically shift without entangling cables associated with other rows.

Note that in general, the cross-connect switch architecture disclosed herein may consist of strands that are not only optical fibers, but also copper twisted pairs, coaxial cables, electrical conductors or even tubing. The apparatus and reconfiguration algorithms disclosed herein apply to all forms of straight-line, tensioned strands.

Those skilled in the art will readily observe that numerous modifications and alterations of the device may be made while retaining the teachings of the invention.

What is claimed is:

1. In a system for interweaving a selected stand within a spatially coherent multiplicity of strands suspended in an interconnection volume between a planar two-dimensional matrix of input terminals disposed in rows and columns, and a spaced apart ordered single axis distribution of strand output terminals in which each input terminal has a unique two-dimensional address, with the strands between the input and output terminals defining three-dimensional vectors, and in which system a strand transport mechanism interweaves a selected strand adjacent the two-dimensional matrix to a different target input terminal in the matrix along a computed trajectory, the rows of terminals in the matrix being incrementally movable in the row direction;

a method for providing a trajectory for reconfiguration of a selected strand between different input terminals without entangling the selected strand with other strands in the multiplicity, the method comprising the steps of:

transporting a selected strand in alternating columnar directions through the multiplicity of strands;

calculating a reconfiguration algorithm in the form of a weaving code for laterally incrementally moving individual rows of the two-dimensional matrix of terminals in timed relation to the columnar position of the strand being transported;

providing lateral incremental movements of selected rows of strands in the two-dimensional distribution according to the calculated weaving code, in timed relation to the columnar position of the strand being transported;

transporting the selected strand along successive columns of the matrix in alternating senses parallel to the single axis dimension, relative to the matrix, and repeating the columnar transporting in alternating directions and timed lateral incremental movements of selected rows until a final output address is reached.

2. A method in accordance with claim 1, including the additional steps of:

transporting the selected strand laterally, to pass to the next adjacent column, after each columnar movement;

effecting independent lateral movements of rows in the two-dimensional matrix of terminals, in alternatively opposite senses dependent on the instantaneous columnar position of a strand to cause the selected strand being transported to weave in a selected relation about a given strand in the distribution, and repeating this process until the selected strand is transported to the different input terminal.

3. The method as set forth in claim 2 above, further including the steps of:

calculating the weaving code based upon knowledge of the vectors of strands in the interconnection volume, and wherein the lateral movements are each an incremental fraction of the interstrand spacing and orthogonal to the columnar direction of the two-dimensional matrix.

4. The method as set forth in claim 3 above, wherein the weaving code is calculated based upon the initial address of the selected strand and the vectors of the other strands that are intermediate between the initial and final address.

5. A method as set forth in claim 1 above, further including the step of translating the selected strand to a temporary docking location adjacent the two-dimensional matrix to enable the selected strand pass a column in the matrix of terminals.

6. A method of reconfiguring a system of fiber optic strands having known vectors extending between changeable terminals disposed in a two-dimensional planar matrix and a fixed linear assembly of output terminals at a mid-span portion along the strands, each strand having unique addresses, in the planar matrix and in the output terminals, wherein the spacings between vertical columns in the two-dimensional matrix are such that they permit transport of a gripper mechanism therebetween and wherein the rows of terminals in the two-dimensional matrix are shiftable in either direction transverse to the columns by a clearance increment adequate to permit passage of the transport mechanism on the opposite side of selected strands, whereby the selected strand can be interwoven without knotting between the three dimensional vectors of existing strands, wherein the method comprises the steps of:

identifying the origination terminal and the desired destination terminal of a strand in the two-dimensional matrix;

accessing the known vectors to calculate a non-knotting two-dimensional path based on shifting rows of terminals by the clearance increment between the origination and destination terminals;

moving the gripper mechanism along the inter-column spacings to the origination terminal;

engaging the selected strand with the gripper mechanism;

successively transporting the selected strand along the inter-column spacings adjacent the two-dimensional matrix in alternating columnar directions;

concurrently with the columnar movement of the strand adjacent selected rows, successively shifting the selected rows by the clearance increment, the row shifting following a first bipolar set of increments for columnar transport of the strand in a first direction, and following a second bipolar set of increments for columnar transport in the second direction, opposite to the first, until the destination terminal is reached, and engaging the selected strand in the two-dimensional matrix at the destination terminal, whereby the transfer between terminals is effected in reduced time and with reduced power requirements, and without knotting of the selected strand with other strands.

7. The method as set forth in claim 6 above, wherein the selected strand is transported along successive columnar spaces in successive, opposite directions according to positive and negative braid characteristics of each column, while transversely incrementing selected rows of preexisting strands in the two-dimensional matrix.

8. The method as set forth in claim 7 above, wherein each columnar transverse of the selected strand between columns is reversed in direction when reaching the end of a column, and further including the steps of docking the selected strand in a terminal outside the two-dimensional matrix while effecting the lateral movements of rows of strands, moving the strand laterally by a columnar increment, and again engaging the docked strand for subsequent columnar movement.

* * * * *